US010078383B2

(12) United States Patent
Katsumata

(10) Patent No.: US 10,078,383 B2
(45) Date of Patent: Sep. 18, 2018

(54) APPARATUS AND METHOD TO DISPLAY MOVED IMAGE DATA PROCESSED VIA A SERVER AT A PREDICTED POSITION ON A SCREEN

(71) Applicant: FUJITSU LIMITED, Kawasaki-shi, Kanagawa (JP)

(72) Inventor: Akira Katsumata, Oota (JP)

(73) Assignee: FUJITSU LIMITED, Kawasaki (JP)

( * ) Notice: Subject to any disclaimer, the term of this patent is extended or adjusted under 35 U.S.C. 154(b) by 220 days.

(21) Appl. No.: 15/285,048

(22) Filed: Oct. 4, 2016

(65) Prior Publication Data

US 2017/0123517 A1 May 4, 2017

(30) Foreign Application Priority Data

Nov. 2, 2015 (JP) .................................. 2015-215445

(51) Int. Cl.
*H04L 29/08* (2006.01)
*G06F 3/038* (2013.01)
(Continued)

(52) U.S. Cl.
CPC ............ *G06F 3/0383* (2013.01); *G06T 7/004* (2013.01); *G09G 5/006* (2013.01); *H04L 43/0852* (2013.01); *H04L 67/125* (2013.01); *H04L 67/42* (2013.01); *G09G 2370/022* (2013.01); *G09G 2370/042* (2013.01); *G09G 2370/045* (2013.01); *G09G 2370/06* (2013.01)

(58) Field of Classification Search
CPC combination set(s) only.
See application file for complete search history.

(56) References Cited

U.S. PATENT DOCUMENTS 5,654,726 A * 8/1997 Mima ................. G06F 3/04892
345/2.2
6,362,842 B1 * 3/2002 Tahara ................ G06F 3/04812
715/705

(Continued)

FOREIGN PATENT DOCUMENTS

JP 4-54520 2/1992
JP 5-268134 10/1993
(Continued)

*Primary Examiner* — Hien L Duong
(74) *Attorney, Agent, or Firm* — Staas & Halsey LLP

(57) ABSTRACT

An apparatus causes a server to execute an application program, and stores, in time series, position-information, obtained by an operation to an input device of the apparatus, on a figure representing a target of the operation on a screen shared between the server and the apparatus. Upon determining that the figure is moved by the operation in the same direction at a speed exceeding a threshold, the apparatus calculates, based on the position-information, first position-information indicating a position at which the figure is expected to be after a lapse of a first time from a current-time where the first time includes a time taken for communication between the apparatus and the server, and transmits the first position-information to the server. Upon receiving, from the server, information of an image on the screen which is obtained by executing the application program based on the first position-information, the apparatus displays the image.

10 Claims, 22 Drawing Sheets

(51) Int. Cl.
*G06T 7/00* (2017.01)
*G09G 5/00* (2006.01)
*H04L 12/26* (2006.01)
*H04L 29/06* (2006.01)

(56) References Cited

U.S. PATENT DOCUMENTS

| | | | | |
|---|---|---|---|---|
| 2007/0183493 | A1* | 8/2007 | Kimpe | G06F 21/6245 |
| | | | | 375/240.1 |
| 2011/0026774 | A1* | 2/2011 | Flohr | G08C 17/02 |
| | | | | 382/106 |
| 2012/0136988 | A1* | 5/2012 | Jackson | H04L 47/365 |
| | | | | 709/224 |
| 2013/0117709 | A1* | 5/2013 | McCormick | G06F 3/04812 |
| | | | | 715/788 |
| 2014/0089812 | A1* | 3/2014 | Matsui | G06F 17/30873 |
| | | | | 715/738 |
| 2015/0145889 | A1* | 5/2015 | Hanai | H04N 5/2621 |
| | | | | 345/633 |
| 2015/0222730 | A1* | 8/2015 | Gower | H04L 67/42 |
| | | | | 709/203 |
| 2016/0299660 | A1* | 10/2016 | Au | G06F 3/0481 |

FOREIGN PATENT DOCUMENTS

| | | |
|---|---|---|
| JP | 2004-13545 | 1/2004 |
| JP | 2008-116995 | 5/2008 |
| JP | 2015-5228 | 1/2015 |

\* cited by examiner

FIG. 9

| TIME | POSITION INFORMATION 900 | |
|---|---|---|
| | x | y |
| t0 | x0 | y0 | — 901-1
| t1 | x1 | y1 | — 901-2
| t2 | x2 | y2 | — 901-3
| ... | ... | ... |

FIG. 10
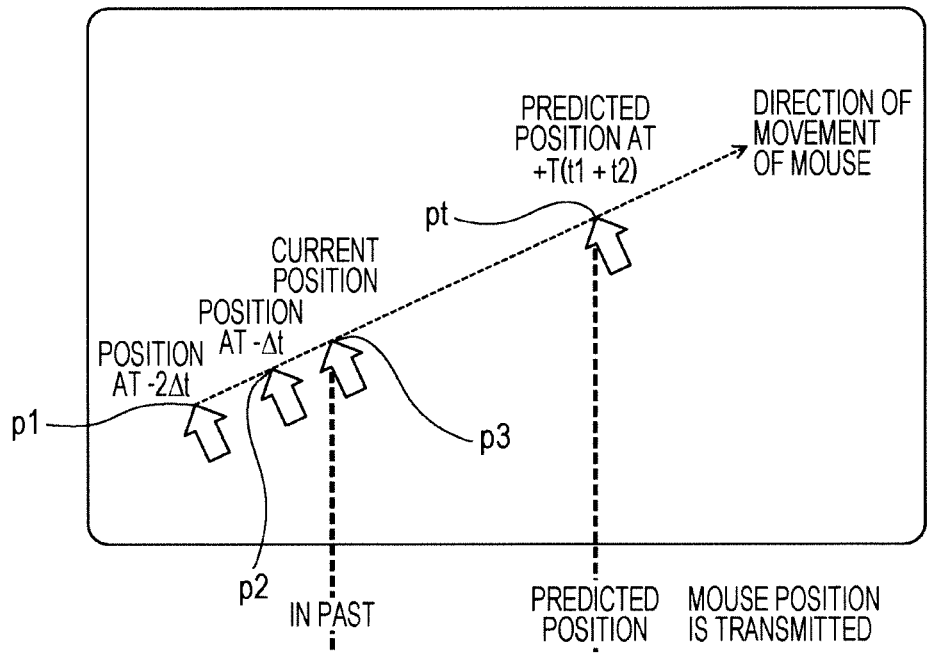
<MOUSE OPERATION ON SCREEN OF CLIENT TERMINAL DEVICE>
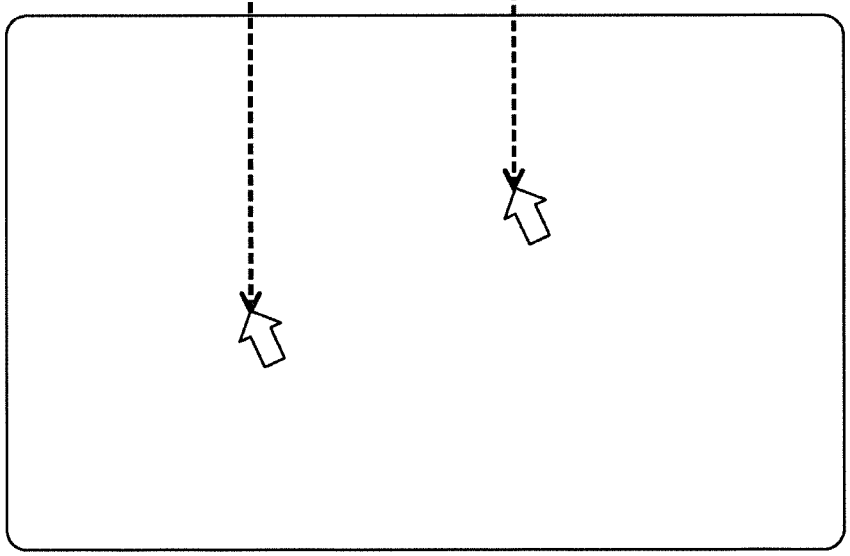
<RECOGNITION OF MOUSE POSITION ON SERVER>

FIG. 15

| TYPES OF CONSTANT | IDENTIFIER | UNIT | STANDARD VALUE |
|---|---|---|---|
| NAKED EYE RESOLUTION | Res | mm | 0.1 |
| DISCRIMINATION FIELD OF VIEW-HORIZONTAL ANGLE | W0h | DEGREE | 5.0 |
| DISCRIMINATION FIELD OF VIEW-VERTICAL ANGLE | W0v | DEGREE | 5.0 |
| EFFECTIVE FIELD OF VIEW-HORIZONTAL ANGLE | W1h | DEGREE | 30.0 |
| EFFECTIVE FIELD OF VIEW-VERTICAL ANGLE | W1v | DEGREE | 20.0 |
| STABLE FIELD OF VIEW-HORIZONTAL ANGLE | W2h | DEGREE | 60.0 |
| STABLE FIELD OF VIEW-VERTICAL ANGLE | W2v | DEGREE | 45.0 |

FIG. 16

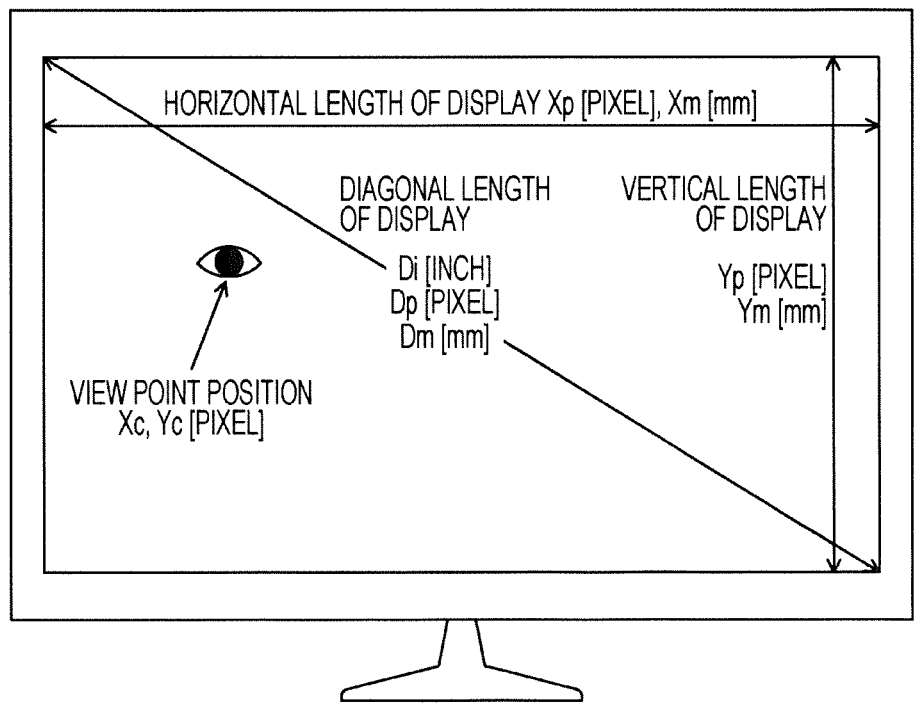

| Di1<br>DISPLAY SIZE<br>(From [INCH]) | Di2<br>DISPLAY SIZE<br>(To [INCH]) | Lm<br>STANDARD VALUE<br>OF DISPLAY<br>DISTANCE [mm] |
|---|---|---|
| 1 | 8 | 150 |
| 8 | 13 | 200 |
| 13 | 18 | 250 |
| 18 | 30 | 500 |
| 30 | 50 | 1,000 |

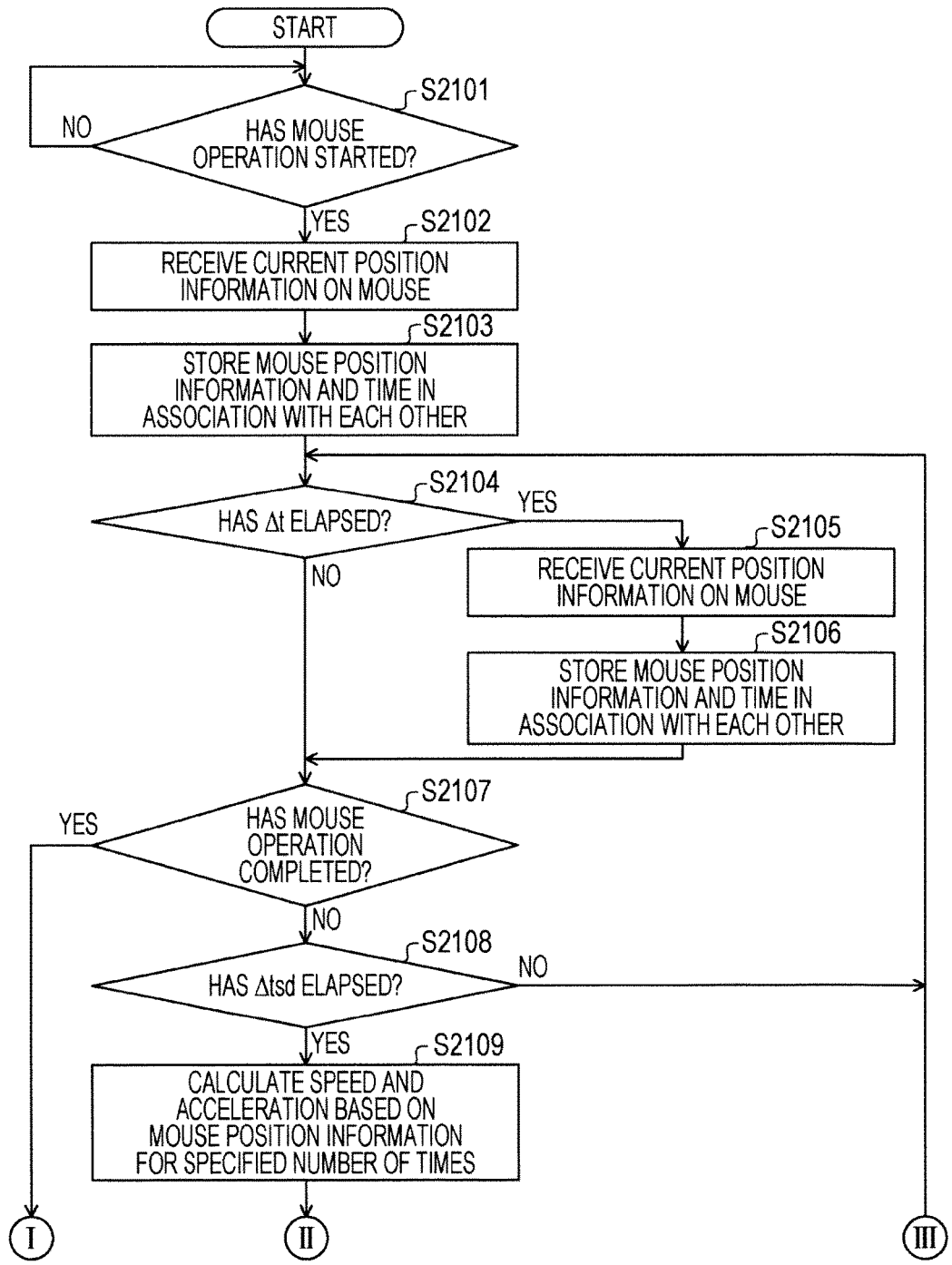

APPARATUS AND METHOD TO DISPLAY MOVED IMAGE DATA PROCESSED VIA A SERVER AT A PREDICTED POSITION ON A SCREEN

CROSS-REFERENCE TO RELATED APPLICATION

This application is based upon and claims the benefit of priority of the prior Japanese Patent Application No. 2015-215445, filed on Nov. 2, 2015, the entire contents of which are incorporated herein by reference.

FIELD

The embodiment discussed herein is related to apparatus and method to display moved image data processed via a server at a predicted position on a screen.

BACKGROUND

A technology called desktop virtualization is known in related art. With the technology called desktop virtualization, for instance, a server executes and stores programs and data, and a client terminal device displays, as a remote desktop, an image of a screen transferred from the server. For instance, the server executes application such as document generation, mail, computer aided design (CAD), or motion video, and the client terminal device displays a result of processing of the application by the server.

In addition, a technology has been known that records a history of a display position of a cursor in a history storage unit, and displays the cursor pointing in a predicted direction of movement of the cursor calculated based on the history of the display position. (see, for instance, Japanese Laid-open Patent Publication No. 2004-013545).

In addition, a technology has been known that, in addition to processing of pointer movement normally performed by a pointer device, detects characteristics of operations of a user of the pointer device in a short time, and moves a pointer instantly to a destination position based on the characteristics (see, for instance, Japanese Laid-open Patent Publication No. 2008-116995).

In addition, a technology has been known in which a base station that manages the position of a mobile station predicts and displays the movement of position coordinates at the time of marker display of the position of the mobile station under the assumption that the mobile station is moving at a travel speed in a travel direction from position coordinates received from the mobile station (see, for instance, Japanese Laid-open Patent Publication No. 5-268134).

In addition, a technology has been known that, based on a current position of a mouse cursor and a past position of the mouse cursor displayed on a screen of a display device, predicts the position of the mouse cursor in the next step, and displays the current position of the mouse cursor and the position of the mouse cursor in the next step (see, for instance, Japanese Laid-open Patent Publication No. 4-054520).

In addition, a technology has been known that, based on the movement records related to the current position of a cursor out of the movement records of the cursor, determines a movement destination of the cursor from the current position and moves the cursor to the determined movement destination (see, for instance, Japanese Laid-open Patent Publication No. 2015-005228).

SUMMARY

According to an aspect of the invention, an apparatus is configured to cause the server to execute an application program, and store, in a memory provided for the apparatus, in time series, pieces of position information on a figure representing a target of an operation on a screen shared between the server and the apparatus where the pieces of position information are obtained by an operation to an input device included in the apparatus. The apparatus determines, based on the pieces of position information stored in time series in the memory, whether or not the figure has been moved by the operation in the same direction on the screen at a speed exceeding a threshold value during an interval from a specific time out of times at which the pieces of position information were obtained to a current time. When it is determined that the figure has been moved in the same direction at a speed exceeding the threshold value, the apparatus calculates a first piece of position information indicating a position at which the figure is expected to be located at a time after a lapse of a first time from the current time, based on the pieces of position information stored in time series in the memory, where the first time includes a time taken for communication between the apparatus and the server. The apparatus transmits operation information including the calculated first piece of position information to the server, and upon receiving, from the server, image information including an image on the screen where the image is obtained by executing the application program based on the transmitted operation information including the calculated first piece of position information, displays the image included in the received image information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of position information, according to an embodiment;

FIG. 10 is a diagram illustrating an example of a mouse operation on a screen of a client terminal device, according to an embodiment;

FIG. 15 is a diagram illustrating an example of a definition table of various types of constants;

FIG. 16 is a diagram illustrating an example of a definition of each length on a display;

FIGS. 21A and 21B are diagrams illustrating an example of an operational flowchart for processing of transmitting operation information by a client terminal device, according to an embodiment;

DESCRIPTION OF EMBODIMENT

In the desktop virtualization, there is a problem in that due to delay of a network between a server and a client terminal device, change of the screen in response to an operation to an input device in the client terminal device is delayed and the operational feeling of a user is lowered.

It is preferable to improve the operational feeling of a user regardless of a network delay.

Hereinafter, an embodiment of a virtual desktop program, a virtual desktop processing method, and a virtual desktop system according to the present disclosure will be described in detail with reference to the accompanying drawings.

Figure 1:
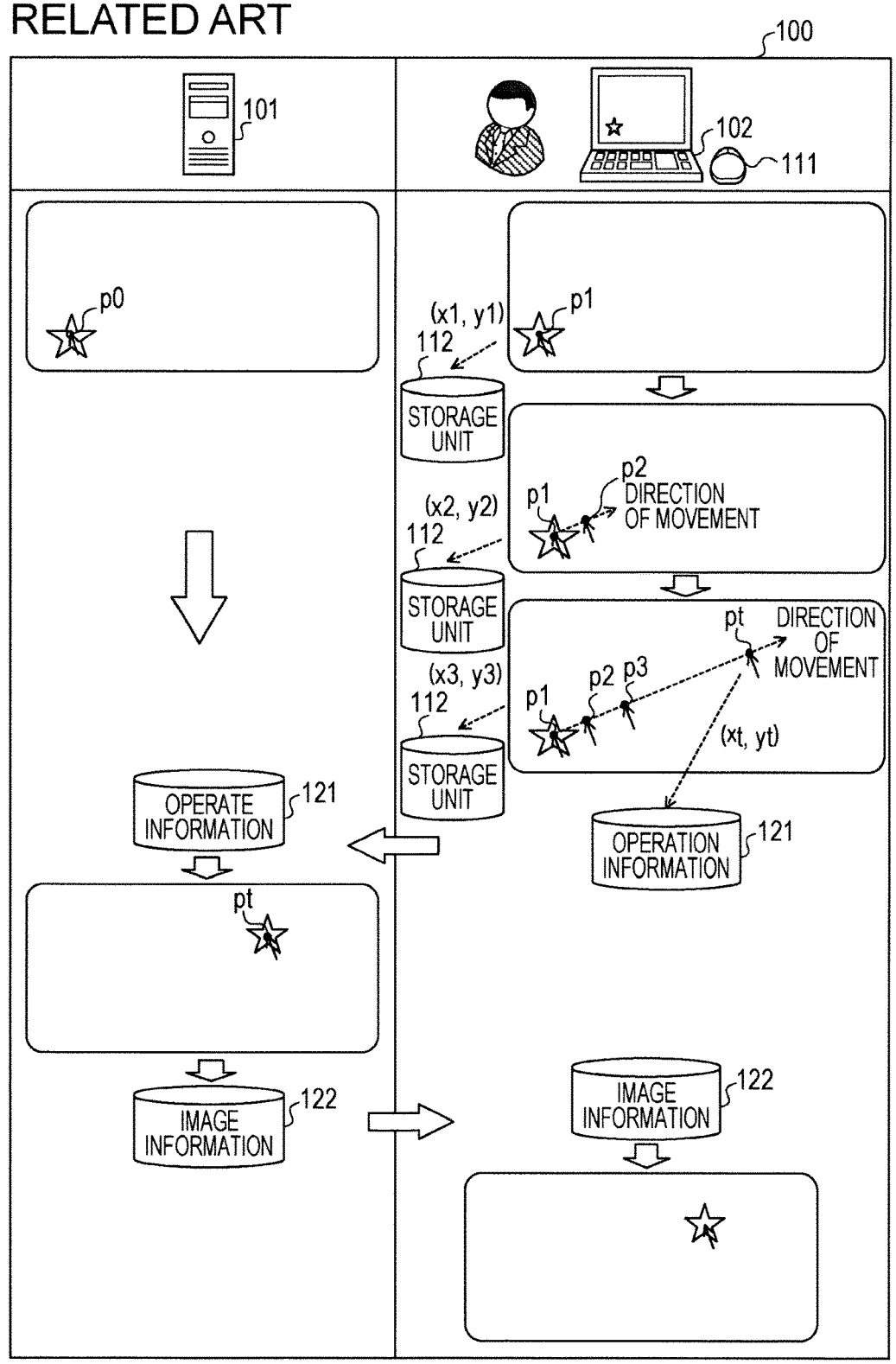
FIG. 1 is a diagram illustrating an example of an operation of a virtual desktop system.

FIG. 1 is an explanatory diagram illustrating an example operation of a virtual desktop system. A virtual desktop system 100 includes a client terminal device 102 and a server 101. The client terminal device 102 is a computer that causes the server 101 to execute a program in desktop virtualization. The server 101 is a computer that executes a program according to a command from the client terminal device 102. The program herein is, for instance, an application program.

In related art, in desktop virtualization, the server 101 executes and stores programs and data. In desktop virtualization, as a remote desktop, the client terminal device 102 displays the image of a screen transferred from the server 101.

In related art, in desktop virtualization, screen change in response to an operation to an input device in the client terminal device 102 is delayed due to a delay in the network between the server 101 and the client terminal device 102.

For instance, when an object on a screen is moved by a mouse operation of a user, a screen, on which the object is moved by a mouse operation at the current time, is displayed in the client terminal device 102 at a time after an elapsed time including at least communication time from the current time. The communication time includes at least a time taken for transmitting position information from the client terminal device 102 to the server 101, and a time taken for transmitting image information including the image of the screen from the server 101 to the client terminal device 102. Thus, a problem arises that the operational feeling of a user is lowered. An example in which screen change is delayed will be described in detail with reference to FIGS. 3 and 4.

In the embodiment, when a pointer is moved in the same direction on the screen at a speed exceeding a threshold value, the client terminal device 102 predicts the position of the pointer after communication and transmits the predicted position to the server 101. Thus, it is possible to display an image on the screen according to the actual position of the pointer without letting a user be aware of delay corresponding to the communication time. Therefore, it is possible to improve the operational feeling of a user.

Specifically, the client terminal device 102 causes a storage unit 112 to store position information on a figure representing a target of operation on the screen in time series, the position information being obtained by an operation to an input device of the client terminal device 102. Here, the screen is shared between the server 101 and the client terminal device 102. The storage unit 112 is a storage device such as a random access memory (RAM) or a disk, for instance.

The input device here is, for instance, a pointing device. The pointing device is used to operate a pointer or an icon displayed on a screen by the display device of the client terminal device 102. The display device is, for instance, a display. Specifically, the input device includes, for instance, a mouse 111, a trackball, and a touch panel. In the embodiment, a description is given using an example of the mouse 111 as the input device. The mouse operation here refers to, for instance, mouse movement and does not refer to an operation of a click point or a wheel.

The figure representing a target of operation on the screen is, for instance, a mark that indicates the location of an operation target on the screen. The figure is, for instance, a mouse pointer. Here, the position information on a figure is also referred to as, for instance, mouse position information, position information on a mouse pointer, or simply position information. The position information here is the coordinate value on the screen when the screen is defined by the x-axis and the y-axis.

Here, causing the storage unit 112 to store position information in time series is such that when a mouse operation is performed, position information is obtained for every predetermined time and may be sequentially stored, or position information is obtained at any timing and the time at which the position information is obtained and the position information may be stored in association with each other. In FIG. 1, an example is described in which the position information is stored for every predetermined time. The predetermined time is denoted by Δt, for instance.

In the example of FIG. 1, the client terminal device 102 allows the mouse pointer to be moved to position p1 by a mouse operation, and causes the storage unit 112 to store position information indicating the position p1 (x1, y1). Next, after a lapse of a predetermined time, the client terminal device 102 allows the mouse pointer to be moved to position p2 by a mouse operation, and causes the storage unit 112 to store the position information (x2, y2) indicating the position p2.

In addition, after a lapse of a predetermined time, the client terminal device 102 allows the mouse pointer to be moved to position p3 by a mouse operation, and causes the storage unit 112 to store the position information (x3, y3) indicating the position p3.

Based on the position information stored in time series in the storage unit 112, the client terminal device 102 determines whether or not a figure has been moved by an operation in the same direction on the screen at a speed exceeding a threshold value during the interval between a specific time and the current time out of the times at which position information is obtained. The threshold value may be set by a user or a developer of the system, for instance.

When it is determined that a figure has been moved in the same direction on the screen at a speed exceeding a threshold value, the client terminal device 102 calculates position information on the figure at a time after a lapse of time longer than or equal to a communication time from the current time. The communication time is, for instance, the time taken for communication between the client terminal device 102 and the server 101. Specifically, the client terminal device 102 calculates position information on the figure at a time after a lapse of time longer than or equal to the communication time from the current time, based on the position information stored in time series in the storage unit 112. In the example of FIG. 1, the client terminal device 102 calculates the position information (xt, yt) indicating position pt.

The client terminal device 102 transmits operation information 121 including the calculated position information to the server 101. The client terminal device 102 receives from the server 101 image information 122 including an image on the screen according to execution of a program based on the transmitted operation information 121.

The client terminal device 102 displays the image included in the received image information 122. The client terminal device 102 outputs the image included in the received image information 122 to a display device, for instance. Display devices include a display, for instance.

Thus, in mouse movement in which predictions are easily made, it is possible to generate an image on the screen according to a mouse position in the near future. When the image information 122 is received, an image on the screen corresponding to the current mouse position may be displayed. Therefore, it is possible to improve the operational feeling of a user regardless of a network delay. The operational feeling is something like better responsiveness to an operation of a user. Also, in the case where a figure is not moved in the same direction or is moved at a low speed, position prediction is not made, and thus position prediction is not made for such mouse movement that is unlikely to be predicted.

Figure 2:
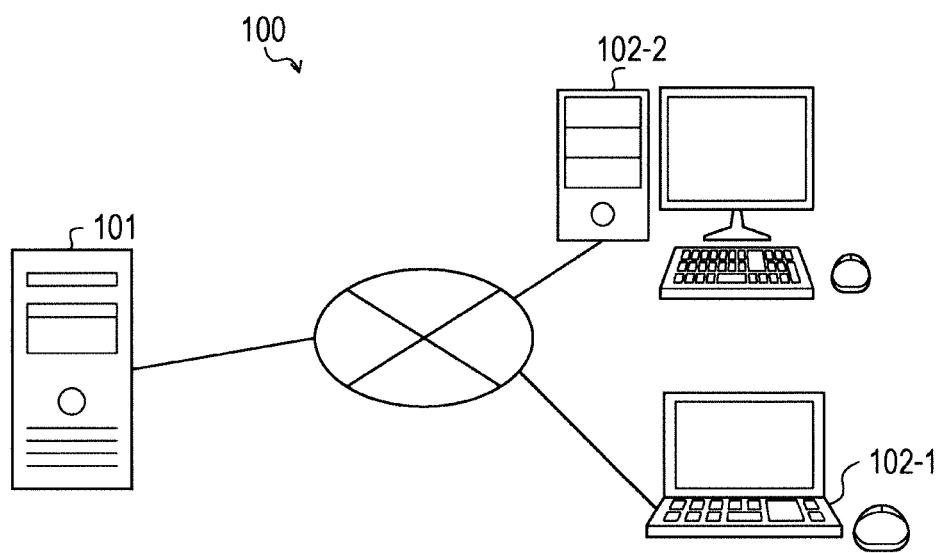
FIG. 2 is a diagram illustrating an example of a configuration of a virtual desktop system.

FIG. 2 is an explanatory diagram illustrating an example application to the virtual desktop system. The virtual desktop system 100 includes, for instance, the server 101 and a plurality of client terminal devices 102. The server 101 and the client terminal devices 102 are coupled to each other via a network. For a network, it is possible to adopt any type of communication network such as the Internet, a local area network (LAN), a wide area network (WAN), and a virtual private network (VPN) regardless of wired or wireless. The client terminal device 102 executes a program by the server 101. Examples of the client terminal device 102 include a mobile terminal device such as a mobile phone, a personal handy phone (PHS), and a personal digital assistant (PDA) in addition to a fixed terminal device such as a personal computer (PC). Examples of a program include an OS and an application.

For instance, when the installation location of the server 101 and the use location of the client terminal device 102 are domestic, network delay time is on the order of 50 [ms]. In network communication, the client terminal device 102 may be used in a location far away from the server 101, for instance, the server 101 is installed in Japan and the client terminal device 102 is used in a country other than Japan. In such a case, network delay time is on the order of 100 [ms].

Figure 3:
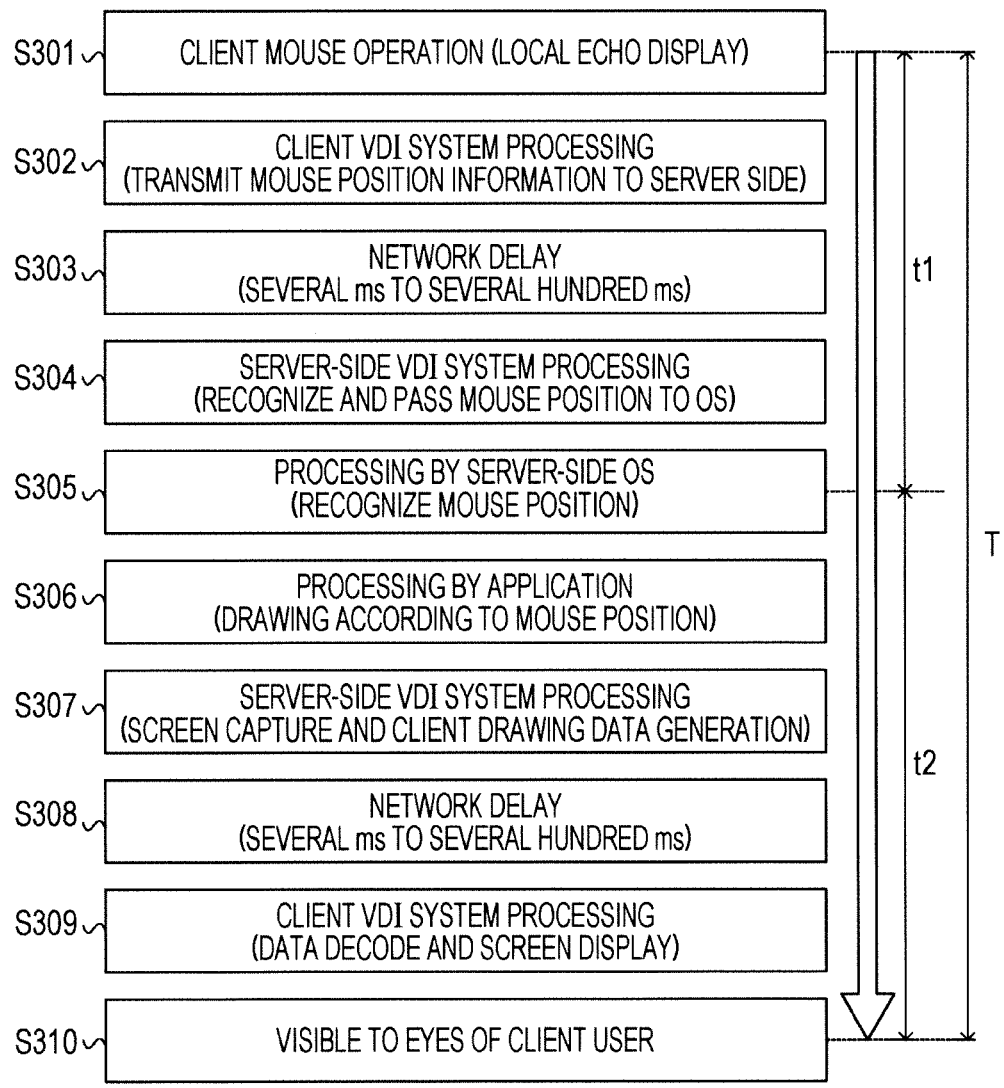
FIG. 3 is a diagram illustrating an example of an operational flowchart for a case where processing and response in a VDI operation are delayed.

FIG. 3 is an explanatory flowchart illustrating an example in which the processing and response in a VDI operation are delayed. The client terminal device 102 receives a mouse operation by a user (step S301). The client terminal device 102 then performs client VDI system processing (step S302). Here, the client terminal device 102 transmits mouse position information to the server 101.

During transmission of a packet including the mouse position information to the server 101 via a network, network delay occurs (step S303). Next, the server 101 performs the server 101-side VDI system processing (step S304). Here, upon receiving the packet including the mouse position information, the server 101 passes the coordinate value of the mouse 111 to an OS.

The server 101 performs processing by the server 101-side OS (step S305). Here, the server 101 recognizes the mouse position information by the server 101-side OS. Here, let t1 be the time from the start of a mouse operation in the client terminal device 102 until the start of the processing by the OS in the server 101, for instance.

The server 101 then performs processing by application (step S306). Here, the server 101 performs drawing according to the mouse position by application. The server 101 performs the server 101-side VDI system processing (step S307). Here, the server 101 captures a screen, and generates drawing data for the client terminal device 102 in order to draw the captured screen. During transmission of a packet including the drawing data to the client terminal device 102 via a network, network delay occurs (step S308).

Next, the client terminal device 102 performs the client VDI system processing (step S309). Here, the client terminal device 102 decodes the drawing data, and displays a screen. The displayed screen is visible to the eyes of a client user (step S310). Here, let t2 be the time from the start of the processing by the OS in the server 101 until the displayed screen is visible to the eyes of a client user, for instance. T is the sum of the time t1 and the time t2.

Figure 4:
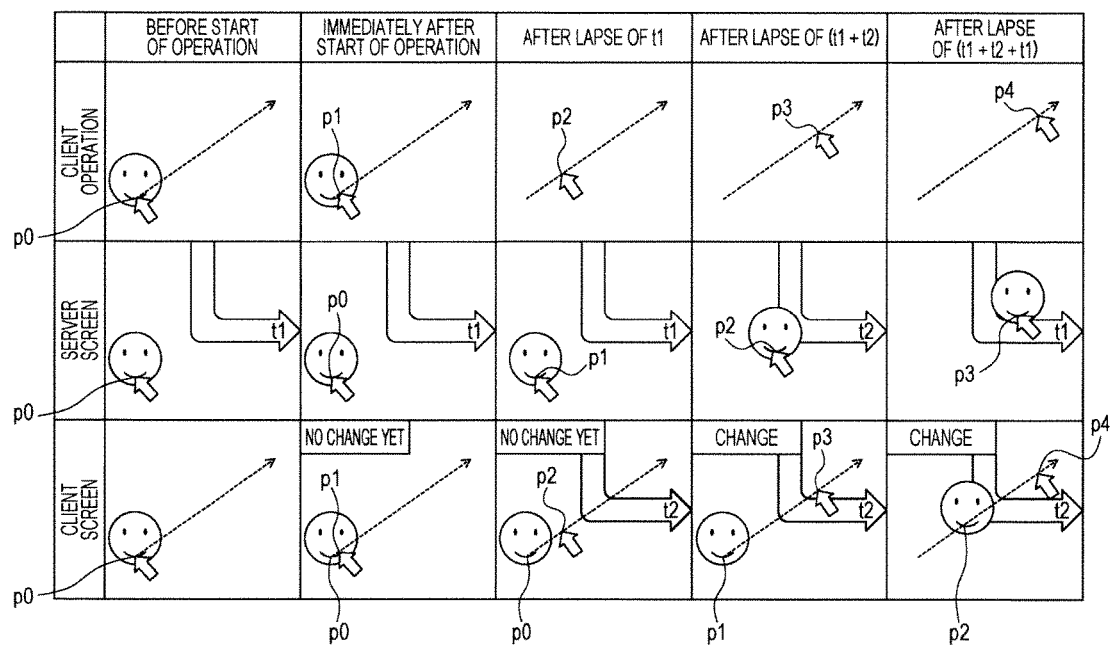
FIG. 4 is a diagram illustrating an example of responsiveness of a mouse operation when current position information is transmitted.

FIG. 4 is an explanatory diagram illustrating an example responsiveness of a mouse operation when the current position information is transmitted. Here, an example is described in which a face mark is moved by a mouse operation. Before the start of a mouse operation by a user, the mouse pointer and the face mark are at position p0 on each screen. Here, a screen generated by the server 101 at each time is referred to as a server screen, and a screen generated by the client terminal device 102 is referred to as a client screen.

When a user starts a mouse operation, the client terminal device 102 transmits to the server 101 position information on the mouse pointer moved by the mouse operation. At this point, neither the client screen nor the server screen is changed. Here, the position information on the mouse pointer may also be referred to as the mouse position information in an abbreviated form. At the time immediately after the start of an operation, on the client screen, the mouse pointer is at position p1 due to a client operation and the face mark is at position p0. At the time immediately after the start of operation, on the server screen, the mouse pointer and the face mark are at position p0.

Next, at the time after a lapse of time t1 from the time immediately after the start of mouse operation, the client terminal device 102 causes the mouse pointer to move to the position p2 by a mouse operation of the user. Thus, on the screen displayed by the client terminal device 102, although the mouse pointer is at the position p2, the face mark is at the position p0. At the time after a lapse of time t1 from the time immediately after the start of operation, the server 101 receives operation information including the mouse position information at the start of operation. Thus, on the server screen, the mouse pointer is at position p1 and the face mark is at the position p1.

Next, at the time after a lapse of time (t1+t2) from the time immediately after the start of operation, the client terminal device 102 causes the mouse pointer to move to position p3, for instance, by a mouse operation of a client. The server 101 receives the operation information including the mouse position information at the time after a lapse of time t1 from the client terminal device 102, and generates image information including an image on the screen by execution of a program according to the operation information. Thus, at the time after a lapse of time (t1+t2) from the time immediately after the start of operation, on the server screen, the mouse pointer and the face mark are at the position p2 moved by a client operation at the time after a lapse of time t1. At the time after a lapse of time (t1+t2) from the start of operation, the server 101 then transmits the image information to the client terminal device 102.

Also, at the time after a lapse of time (t1+t2), the client terminal device 102 receives the image information transmitted from the server 101 at the time after a lapse of time t1, and displays the image included in the image information. Thus, on the client screen, although the mouse pointer is at the position p3, the face mark is at the position p1.

Next, at the time after a lapse of time (t1+t2+t1) from the time immediately after the start of operation, the client terminal device 102 causes the mouse pointer to move to position p4, for instance, by a mouse operation. The server 101 receives operation information including the mouse position information at the time after a lapse of time (t1+t2) from the client terminal device 102, and generates image information including an image on the screen by execution of a program according to the operation information. Thus, on the server screen, the mouse pointer and the face mark are at the position p3 moved by a client operation at the time after a lapse of time (t1+t2). The server 101 then transmits the image information to the client terminal device 102.

Also, at the time after a lapse of time (t1+t2+t1) from the time immediately after the start of operation, the client terminal device 102 receives the image information transmitted from the server 101 at the time after a lapse of time (t1+t2) from the time immediately after the start of operation. Thus, at the time after a lapse of time (t1+t2+t1) from the time immediately after the start of operation, on the client screen, although the mouse pointer is at the position p4, the face mark is at the position p2. Due to the time taken for communication between the server 101 and the client terminal device 102, it takes time for a result of a mouse operation to be reflected in the client screen.

Figure 5:
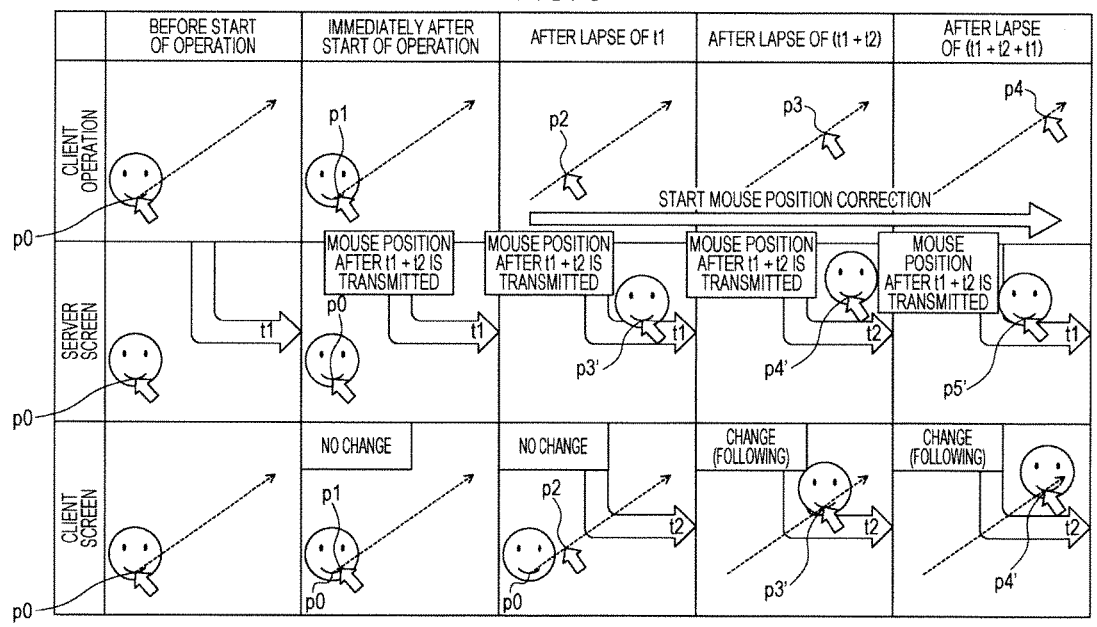
FIG. 5 is a diagram illustrating an example of responsiveness of a mouse operation when predicted position information is transmitted, according to an embodiment.

FIG. 5 is an explanatory diagram illustrating an example responsiveness of a mouse operation when predicted position information is transmitted. As described above, in the embodiment, when a mouse is moved in the same direction on the screen at a speed exceeding a threshold value, the client terminal device 102 predicts the position of the mouse after communication delay and transmits the predicted position to the server. Thus, it is possible to display an image on the screen according to the predicted mouse position at the time after a lapse of the communication time. Therefore, it is possible to improve the operational feeling of a user regardless of a communication delay.

First, before the start of an operation, the mouse pointer and the face mark are at the same position p0. At the time immediately after the start of operation, the client terminal device 102 causes the mouse pointer to move to the position p1 by a mouse operation. Here, on the server screen, the face mark and the mouse pointer are at the position p0. Also, on the client screen, the face mark is at the position p0, and the mouse pointer is at the position p1. The client terminal device 102 transmits a mouse position p3' at the time after a lapse (t1+t2) from the time immediately after the start of operation. The mouse position at the time after a lapse (t1+t2) is the predicted position.

Next, at the time after a lapse of time t1 from the time immediately after the start of operation, the client terminal device 102 causes the mouse pointer to move to the position p2 by a mouse operation. Here, at the time after a lapse of time t1 from the time immediately after the start of operation, the server 101 receives the mouse position p3' transmitted from the client terminal device 102 at the time immediately after the start of operation. Thus, on the server screen, the mouse pointer and the face mark are at the position p3' received. Also, on the client screen, the face mark is at the position p0, and the mouse pointer is at the position p2. The client terminal device 102 transmits a mouse position p4' at the time after a lapse of time (t1+t2+t1) from the time immediately after the start of operation.

Next, at the time after a lapse of time (t1+t2) from the time immediately after the start of operation, the client terminal device 102 causes the mouse pointer to move to the position p3 by a mouse operation. Here, at the time after a lapse of time (t1+t2) from the time immediately after the start of operation, the server 101 receives mouse position p4' transmitted from the client terminal device 102 at the time after a lapse of t1 from the time immediately after the start of operation. Thus, on the server screen, the mouse pointer and the face mark are at the position p4' received. Also, on the client screen, the face mark and the mouse pointer are at the position p3'. The client terminal device 102 transmits mouse position p5' at the time after a lapse of time (t1+t2) from the time after a lapse of time (t1+t2).

Next, at the time after a lapse of time (t1+t2+t1) from the time immediately after the start of operation, the client terminal device 102 causes the mouse pointer to move to the position p4 by a mouse operation. Here, at the time after a lapse of time (t1+t2+t1) from the time immediately after the start of operation, the server 101 receives the mouse position p5' transmitted from the client terminal device 102 at the time after a lapse of time (t1+t2) from the time immediately after the start of operation. Thus, on the server screen, the mouse pointer and the face mark are at the predicted mouse position p5'. Also, on the client screen, the face mark and the mouse pointer are at the predicted mouse position p4'. The client terminal device 102 transmits a mouse position p6' at the time after a lapse of time (t1+t2) from the time after a lapse of time (t1+t2+t1).

(Example Hardware Configuration of Client Terminal Device 102)

Figure 6:
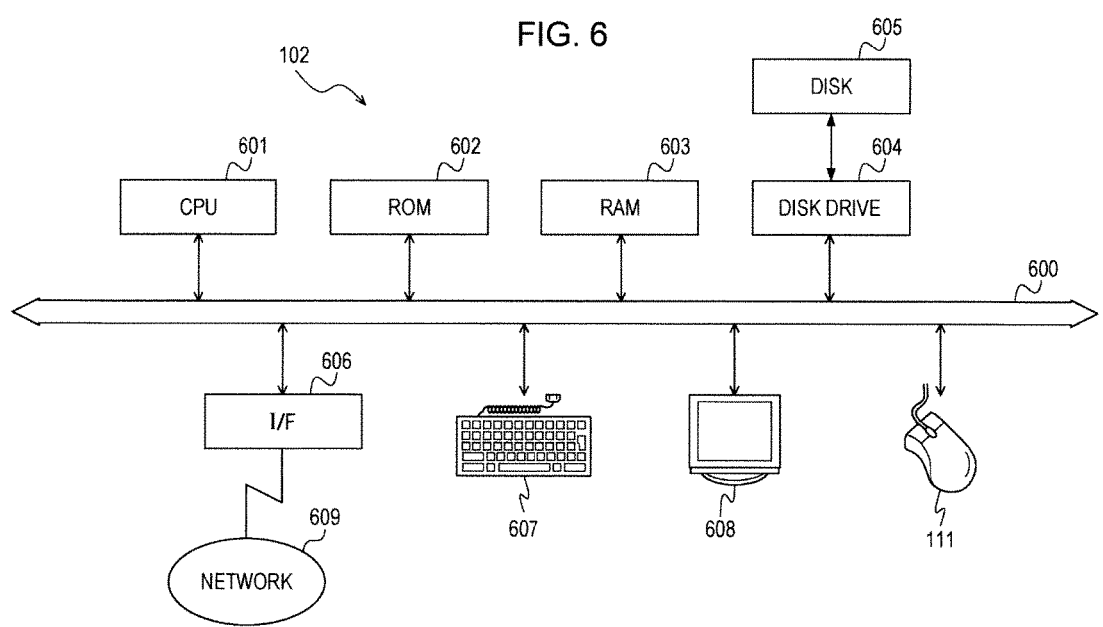
FIG. 6 is a diagram illustrating an example of a hardware configuration of a client terminal device, according to an embodiment.

FIG. 6 is an explanatory diagram illustrating an example hardware configuration of the client terminal device. The client terminal device 102 includes a central processing unit (CPU) 601, a read only memory (ROM)602, a RAM 603, a disk drive 604, and a disk 605. In addition, the client terminal device 102 includes an I/F 606, a keyboard 607, a mouse 111, and a display 608. Also, the CPU 601, the ROM 602, the RAM 603, the disk drive 604, the I/F 606, the keyboard 607, the mouse 111, and the display 608 are coupled with one another via a bus 600.

Here, the CPU 601 manages overall control of the client terminal device 102. The ROM 602 stores a programs such as a boot program. The RAM 603 is used as a work area of the CPU 601. The disk drive 604 controls reading and writing of data from and to the disk 605 according to the control of the CPU 601. The disk 605 stores the data which is written by the control of the disk drive 604. Examples of the disk 605 include a magnetic disk, and an optical disk.

The I/F 606 is coupled to a network 609 such as a LAN, a WAN, and the Internet via a communication line, and is coupled to other devices via the network 609. The I/F 606 serves as the interface between the network 609 and the inside, and controls input/output of data from an external device. As the I/F 606, for instance, a modem or a LAN adapter may be used.

The keyboard 607 and the mouse 111 are each an interface that inputs various data by an operation of a user. The display 608 is an interface that outputs data by a command of the CPU 601.

Although illustration is omitted, the client terminal device 102 may include an input device that captures an image or a video from a camera, or an input device that takes voice from a microphone. Although illustration is omitted, the client terminal device 102 may include an output device such as a printer.

(Example Hardware Configuration of Server 101)

Figure 7:
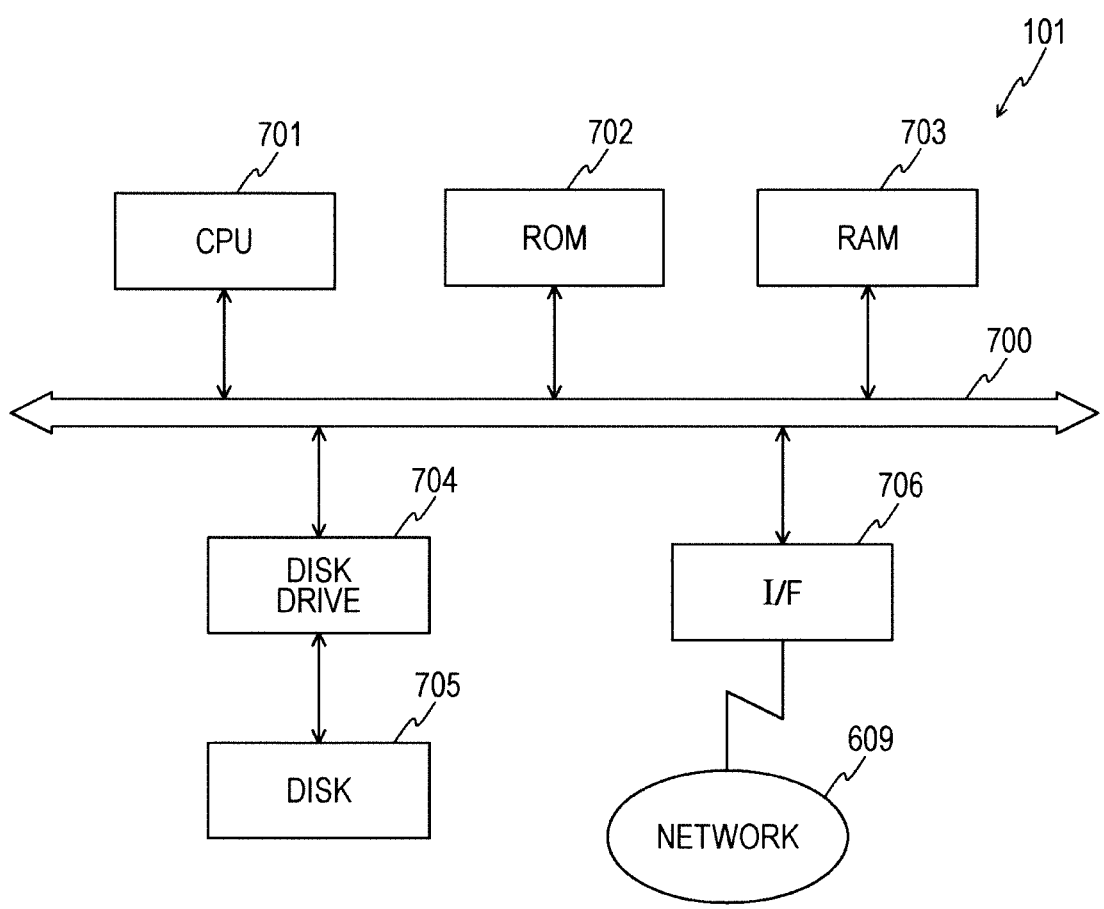
FIG. 7 is a diagram illustrating an example of a hardware configuration of a server, according to an embodiment.

FIG. 7 is an explanatory diagram illustrating an example hardware configuration of the server. The server 101 includes a CPU 701, a ROM 702, a RAM 703, a disk drive 704, a disk 705, and an inter/face (I/F) 706.

The CPU 701, the ROM 702, the RAM 703, the disk drive 704, the I/F 706 are coupled with one another via a bus 700.

Here, the CPU 701 manages overall control of the server 101. The ROM 702 stores various programs. The programs stored in the ROM 702 are loaded into the CPU 701, thereby causing the CPU 701 to execute coded processing. The RAM 703 is used as a work area of the CPU 701.

The I/F 706 is coupled to the network 609 and is coupled to other devices via the network 609. The I/F 706 serves as the interface between the network 609 and the inside, and controls input/output of data from an external device. As the I/F 706, for instance, a modem or a LAN adapter may be used.

The disk drive 704 controls reading and writing of data from and to the disk 705 according to the control of the CPU 701. The disk 705 stores the data which is written by the control of the disk drive 704. Examples of the disk 705 include a magnetic disk, and an optical disk.

In addition to the above-mentioned components, the server 101 may include for instance, a solid state drive (SSD), a keyboard, the mouse 111, and a display.

(Example Functional Configuration of Virtual Desktop System)

Figure 8:
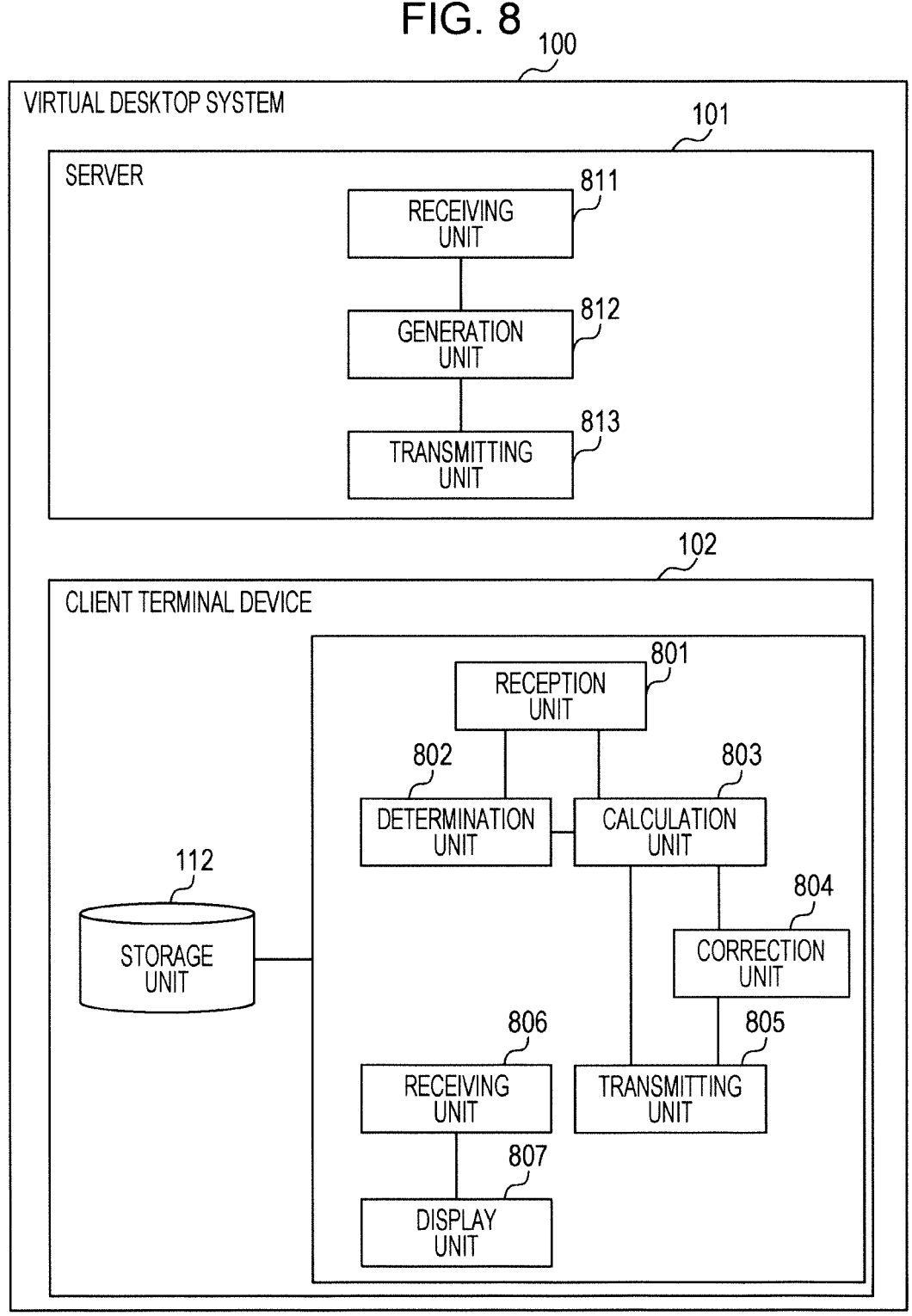
FIG. 8 is a diagram illustrating an example of a functional configuration of a virtual desktop system, according to an embodiment.

FIG. 8 is a block diagram illustrating an example functional configuration of the virtual desktop system. The client terminal device 102 includes a receiving unit 801, a determination unit 802, a calculation unit 803, a correction unit 804, a transmitting unit 805, a receiving unit 806, a display unit 807, and a storage unit 112. The processing of each control unit from the reception unit 801 to the display unit 807 is coded in a program stored in, for instance, a storage device such as the ROM 602, the RAM 603, the disk 605 accessible by the CPU 601 illustrated in FIG. 6. The CPU 601 then reads the program from the storage device, and executes the processing coded in the program. In this manner, the processing of the control unit is achieved. Also, a result of the processing of the control unit is stored in a storage device such as the RAM 603, the ROM 602, the disk 605, for instance. The storage unit 112 is achieved by a storage device such as the RAM 603, the ROM 602, the disk 605, for instance.

The server 101 includes a receiving unit 811, a generation unit 812, and a transmitting unit 813. The processing of each control unit from the receiving unit 811 to the transmitting unit 813 is coded in a program stored in, for instance, a storage device such as the ROM 702, the RAM 703, the disk 705 accessible by the CPU 701 illustrated in FIG. 7. The CPU 701 then reads the program from the storage device, and executes the processing coded in the program. In this manner, the processing of the control unit is achieved. Also, a result of the processing of the control unit is stored in a storage device such as the ROM 702, the RAM 703, the disk 705, for instance.

The position information, which is obtained by an operation to the input device included in the client terminal device 102 and which is on a figure representing a target of operation on the screen shared between the server 101 and the client terminal device 102, is stored in the storage unit 112 by the reception unit 801 at each time the position information is obtained. The input device here is a pointing device, for instance. The pointing device is used to operate a pointer or an icon displayed on a screen by the display device of the client terminal device 102. The display device is, for instance, the display 608. Specifically, the input device includes, for instance, a mouse 111, a trackball, and a touch panel. In the embodiment, a description is given using an example of the mouse 111 as the input device. The mouse operation here refers to, for instance, mouse movement and does not refer to an operation of a click point or a wheel.

The figure representing a target of operation on the screen is, for instance, a mark that indicates the location of an operation target on the screen. The figure is, for instance, a mouse pointer. Here, the position information on a figure is also referred to as, for instance, mouse position information, position information on a mouse pointer, or simply position information. The position information here is the coordinate values on the screen when the screen is defined by the x-axis and the y-axis.

The reception unit 801 receives mouse position information, for instance, at a predetermined time interval, and causes the storage unit 112 to store the mouse position information. The predetermined time interval is denoted by Δt, for instance. Also, the reception unit 801 receives, for instance, mouse position information at each time, and stores the mouse position information and the time of the receiving in the storage unit 112 in association with each other. In addition, it is possible to predict mouse position information with high accuracy by setting that the predetermined time interval Δt<the time interval at which to transmit the mouse position information to the server 101.

Specifically, for instance, when a mouse operation is started, the reception unit 801 receives mouse position information at every predetermined time interval Δt, and causes the storage unit 112 to store the mouse position information and the time of the receiving in association with each other.

FIG. 9 is an explanatory diagram illustrating example storage of position information. A table 900 includes fields for time and position information, for instance. Information is set to each field and is stored as records (such as 901-1 to 901-3). It is sufficient that the table 900 store position information to be just used when at least an acceleration and a speed are calculated.

For instance, in order to predict the position information in the near future by using acceleration, it is sufficient to store the position information for three times in the past including the position information at the current time. Thus, the storage unit 112 may store position information, for instance, by overwriting old information sequentially out of the position information other than the position information for three times in the past. In this manner, it is possible to save memory space. Also, when the time interval at which to receive mouse position information is short, it is possible to improve the accuracy of the mouse position by an increased number of position information.

The reception unit 801 receives mouse position information at every predetermined time interval Δt, for instance, and stores the position information in the table. When a position is calculated in the client terminal device 102, it is set that the time interval Δt<the time interval at which to transmit the mouse position information. Thus, it is possible to achieve improvement of prediction accuracy of the mouse position.

Next, based on the position information stored in time series in the storage unit 112, the determination unit 802 illustrated in FIG. 8 determines whether or not a figure has been moved by an operation in the same direction on the screen at a speed exceeding a threshold value during the interval between a specific time and the current time out of the times at which position information is obtained.

Specifically, the determination unit 802 determines whether or not the mouse pointer has been moved in the same direction on the screen, for instance, based on the position information during the interval between a specific time and the current time. The specific time is, for instance, the time predetermined time Δt*2 before the current time or the time predetermined time Δt*4 before the current time.

Specifically, for instance, when the origin is set to the mouse position at a specific time, the determination unit 802 determines whether or not the mouse position is in the same quadrant during the interval between the specific time and the current time. When it is determined that each mouse position is in the same quadrant, the determination unit 802 determines that the mouse pointer has been moved in the same direction on the screen. When it is determined that each mouse positions is not in the same quadrant, the determination unit 802 determines that the mouse pointer has not been moved in the same direction on the screen.

The determination unit 802 also calculates the speed of movement of the mouse pointer based on the position information during the interval between the specific time and the current time. The determination unit 802 determines whether or not the calculated speed is greater than or equal to a threshold value. The threshold value is pre-stored in a storage device such as the RAM 603, the ROM 602, or the disk 605.

When it is determined that the mouse pointer has been moved on the screen in the same direction at a speed greater than or equal to a threshold value, the calculation unit 803 calculates mouse position information based on the speed at the time after a lapse of a predetermined time from the current time. The predetermined time here includes, for instance, the time taken for communication between the server 101 and the client terminal device 102. The predetermined time is denoted by T. Specifically, the predetermined time T is, for instance, the total time of the time t1 and the time t2 described above, where t1=½*round-trip time (RTT)+(time taken by the client terminal device 102), and t2=½*RTT+(time taken by the server 101).

RTT is an elapsed time since transmission of a message to a certain remote place until return of the message, for instance. Here, RTT is an elapsed time since transmission of an IP packet from the client terminal device 102 to the server until return of response to the IP packet. The time taken in the client terminal device 102 and the time taken in the server 101 may be predetermined.

For instance, during an idle time when a mouse operation and a keyboard operation are not performed, the client terminal device 102 issues an IP packet to the server 101 in order to check network communication, and checks whether the packet is delivered correctly and response is made, thereby obtaining the RTT. A command for issuing an IP packet here is Ping command, for instance.

The calculation unit 803 may determine position information, for instance, as described in Japanese Laid-open Patent Publication No. 5-268134 mentioned above. When the current position information is denoted by (x0, y0) and predicted position information is denoted by (x1, y1), the calculation unit 803 may calculate the position information (x1, y1), for instance, in the following manner, where v0 is movement speed and θ0 is the direction of movement.

$$x1=x0+v0*T*\cos\theta0$$

$$y1=y0+v0*T*\sin\theta0$$

Also, when it is determined that the mouse pointer has been moved on the screen in the same direction at a speed greater than or equal to a threshold value, the calculation unit 803 may calculate the mouse position based on the acceleration at the time after a lapse of a predetermined time T from the current time. It is to be noted that a negative numerical value of the acceleration indicates deceleration. Specifically, the calculation unit 803 may determine position information, for instance, as described in Japanese Laid-open Patent Publication No. 04-054520 mentioned above.

FIG. 10 is an explanatory diagram illustrating an example mouse operation 1 on the screen of the client terminal device. Example 1 illustrates the case where the line connecting pass points of the mouse pointer moved by a mouse operation is a straight line segment. The position p3 is the mouse position at the current time. The position p2 is the mouse position at the time Δt before the current time. The position p1 is the mouse position at the time 2Δt before the current time.

For instance, when the origin is set to the position p1, the determination unit 802 determines whether or not the position p2 and the position p3 are in the same quadrant. Since both points are in the same quadrant in the example of FIG. 10, the determination unit 802 determines that the mouse pointer has been moved in the same direction on the screen.

The calculation unit 803 calculates the speed of mouse movement, for instance, based on the position p1, the position p2, and the position p3. The calculation unit 803 then calculates position pt at the time after a lapse of a predetermined time T from the current time. Thus, a predicted position at the time after a lapse of a predetermined time T from the current time is determined. The transmitting unit 805 then transmits operation information including the position information on the position pt to the server 101.

Also, the determination unit 802 determines whether the line connecting pass points of the mouse pointer is a straight line segment or an arc line segment based on the position information at each time.

The determination unit 802 may determine whether or not the line is a straight line segment by determining whether or not three points based on the position information at three times including the current time lie on a straight line. When it is determined that the three points lie on a straight line, the determination unit 802 determines that the line connecting the pass points is a straight line segment. For instance, when the slope of the straight line segment connecting the position p1 and the position p2, and the slope of the straight line segment connecting the position p2 and the position p3 are the same, the determination unit 802 determined that the line connecting the pass points is a straight line segment. Also, when the difference between the slope of the straight line segment connecting the position p1 and the position p2, and the slope of the straight line segment connecting the position p2 and the position p3 is less than or equal to a threshold value, the determination unit 802 may determine that the three points lie on a straight line. Thus, it is possible to take an error into consideration.

Based on the position information at three times including the current time, the determination unit 802 may determine whether or not three points forms an arc line segment depending on whether or not it is possible to generate an arc line segment that passes through the three points. Since a method of forming an arc line segment that passes through three points is known, the method is not particularly described. When error is allowed in the determination of whether or not three points on a straight line, the determination unit 802 may determine that a line connecting three points is an arc line segment and a straight line segment. For the purpose of simplifying the processing, the determination unit 802 may determine, for instance, that a line connecting three points is a straight line segment. Also, it is determined that a line connecting three points is not a straight line segment, the determination unit 802 may determine that the line connecting three points is an arc line segment.

When it is determined that the line connecting three points is a straight line segment, the calculation unit 803 calculates position information at the time after a lapse of a predetermined time T from the current time. An example of a straight line segment is illustrated in FIG. 10, for instance. When it is determined that the line connecting three points is an arc line segment, the calculation unit 803 calculates position information on the arc line segment at the time after a lapse of a predetermined time T from the current time.

Figure 11:
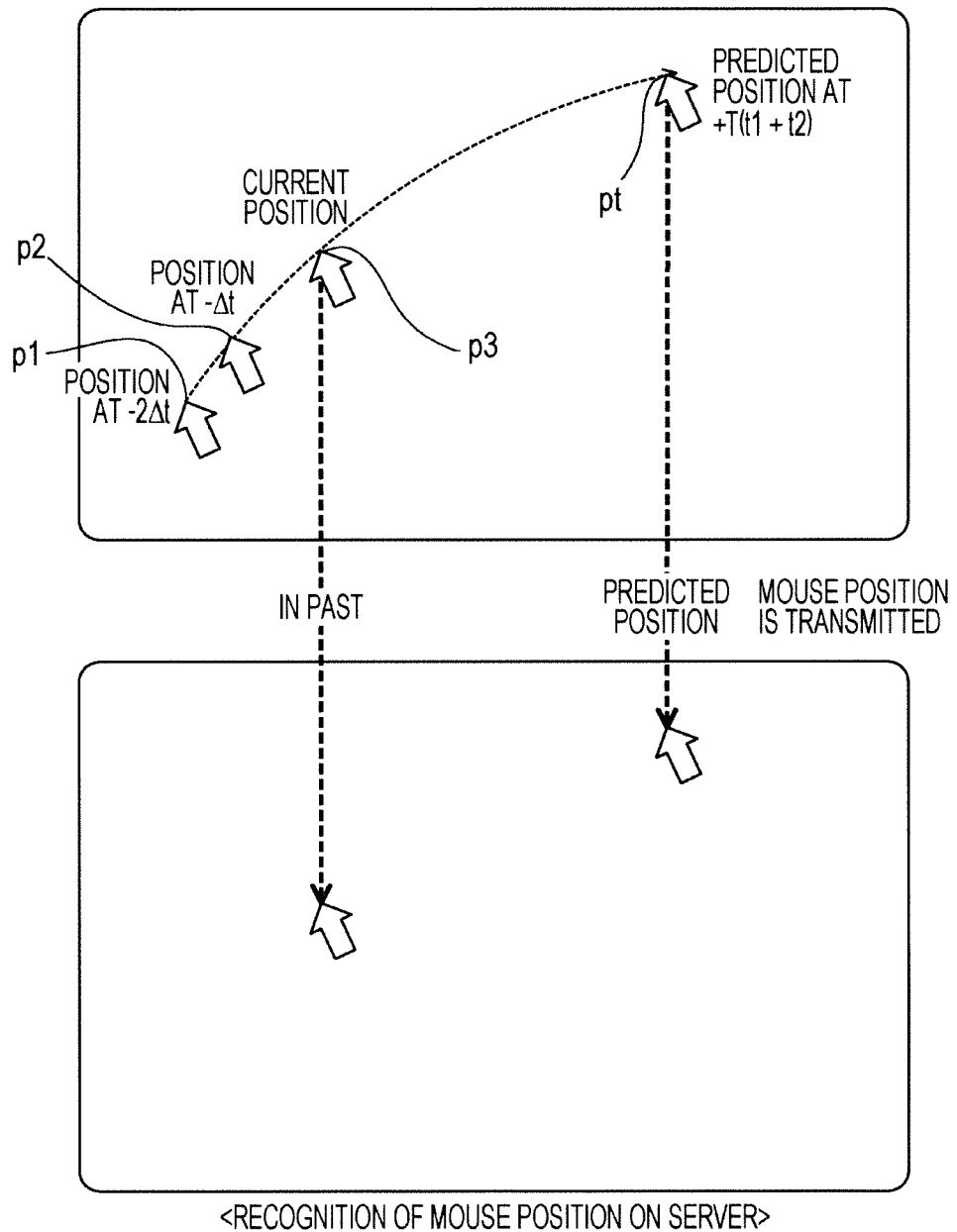
FIG. 11 is a diagram illustrating an example of a mouse operation on a screen of a client terminal device, according to an embodiment.

FIG. 11 is an explanatory diagram illustrating an example mouse operation 2 on the screen of the client terminal device. Example 2 illustrates the case where the path of the mouse pointer moved by a mouse operation is an arc line segment. The calculation unit 803 interpolates the arc line segment, for instance, based on the position p1, the position p2, and the position p3, thereby calculating position information on position pt on the arc line segment at the time after a lapse of a predetermined time T from the current time.

Here, although it is determined whether the line connecting three points is an arc line segment or a straight line segment, without being limited to this, the calculation unit 803 may calculate predicted position for both cases. Next, the transmitting unit 805 of the client terminal device 102 transmits to the server 101 operation information including the position information on the calculated position pt at the time after a lapse of a predetermined time T from the current time. The operation information is, for instance, packet information including position information on the mouse position and header information. The mouse position information has, for instance, information on the x-axis coordinate value and the y-axis coordinate value of the mouse pointer on the screen. In practice, the mouse position information is encrypted.

The receiving unit 811 of the server 101 then receives, for instance, operation information from the client terminal device 102. The receiving unit 811 of the server 101 receives image information via the I/F 706, for instance. The generation unit 812 of the server 101 generates image information including an image on the screen according to the operation information. The generation unit 812 of the server 101 generates image information including an image on the screen according to execution of a program, the screen being shared between the client terminal device 102 and the server 101. The image information is, for instance, a packet including information on images and metadata. Information formats of image include BitMaP (BMP), Joint Photographics Experts Group (JPEG), Graphics Interchange Format (GIF), and Portable Network Graphics (PNG), but are not particularly limited. When a video format is used for image information, the video format includes Audio Video Interleave (AVI), Moving Picture Experts Group (MPEG), MPEG-4 AVC (H.264), original compression format, but is not particularly limited. The transmitting unit 813 of the server 101 transmits the image information to the client terminal device 102.

The receiving unit 806 of the client terminal device 102 receives the image information. The receiving unit 806 of the client terminal device 102 receives the image information via the I/F 606, for instance. The display unit 807 then displays the image included in the image information received by the receiving unit 806.

Next, in the embodiment, when the mouse position in the near future is calculated, the client terminal device 102 may correct the calculated mouse position by providing an estimation limit point in order to avoid losing sight of an object on the screen due to failed prediction of the mouse position. The object on the screen is an object on the computer, which is moved by a mouse operation. In the example of FIG. 4 or FIG. 5, the object is a face mark.

The correction unit 804 identifies a range of view on the screen based on the position information at the current time and the view width according to a specific field of view. When the position indicated by the calculated position information is not included in the identified range of view, the correction unit 804 corrects the position indicated by the calculated position information so that the corrected position is included in the identified range of view.

Here, before detailed description of the correction unit 804 is given, the field of view of human, coefficients for determining a range of view on the screen will be briefly described.

Figure 12:
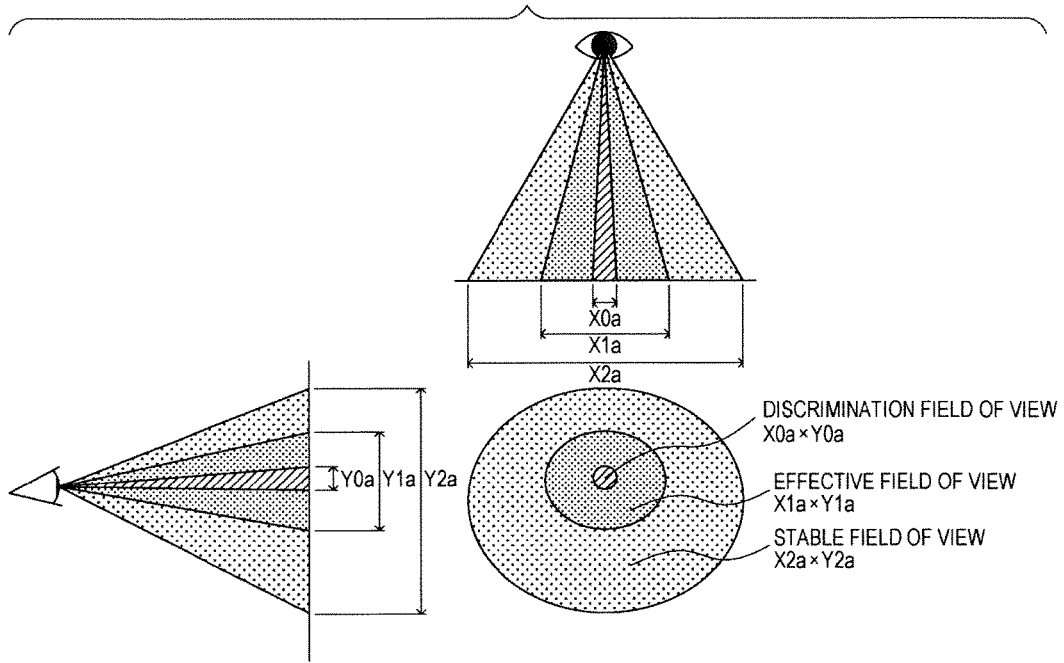
FIG. 12 is a diagram illustrating an example of a field of view of a human.

FIG. 12 is an explanatory diagram illustrating a field of view of human. The field of view, which provides superior pinpoint vision without moving the human eyeball, is very narrow. The vision of human is reduced as a field of view is more away from the central field of view. Discrimination field of view is the central area where visual function such as eyesight is superior. The discrimination field of view has a view angle within approximately 5 degrees. Effective field of view is an area that allows information to be received instantaneously by only movement of the eyeball. The effective field of view has a horizontal view angle within approximately 30 degrees and a vertical view angle within approximately 20 degrees. Stable field of view is an area that allows vision to be focused effortlessly by moving the eyeball and the head and that allows effective reception of information to be achieved. The stable field of view has a horizontal view angle approximately 60 to 90 degrees and a vertical view angle within approximately 45 to 70 degrees.

For instance, when the coordinate value of the calculated mouse position is out of the discrimination field of view or the effective field of view of a user, a limit point is set to the discrimination field of view or the effective field of view, thereby avoiding a user from losing sight of an object away from the mouse pointer. Here, the viewpoint position is the mouse position at the current time.

Figure 13:
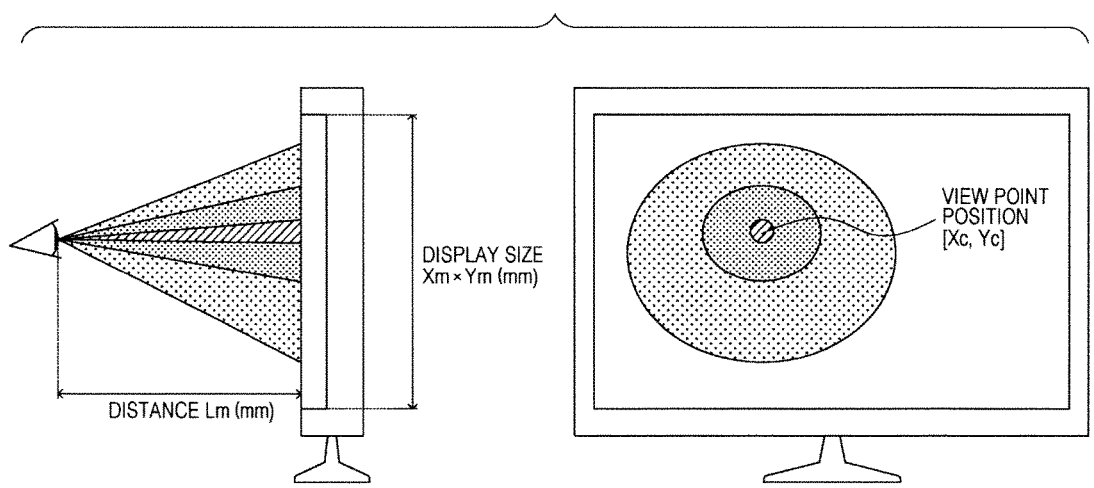
FIG. 13 is a diagram illustrating an example of a field of view on a display.

FIG. 13 is an explanatory diagram illustrating an example field of view on the display. The distance from the eyeball to the display 608 is Lm [mm]. The size of the display 608 is Xm×Ym [mm]. The viewpoint position is [Xc, Yc].

Figure 14:
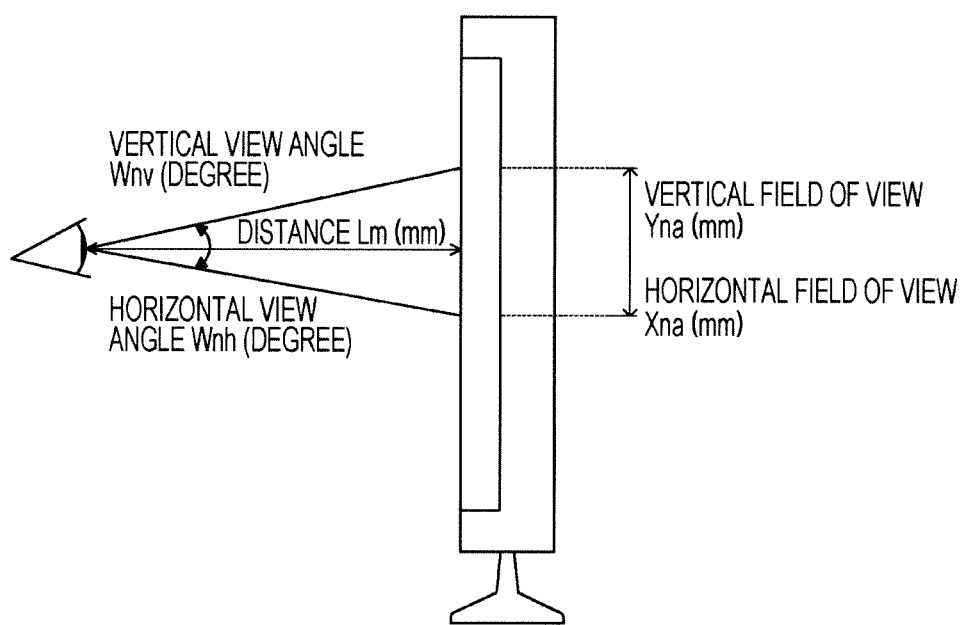
FIG. 14 is a diagram illustrating an example of view angle and view width.

FIG. 14 is an explanatory diagram illustrating example view angle and view width. The vertical angle for vertical vision is denoted by Wnv, and the horizontal angle for horizontal vision is denoted by Wnh. The view width for vertical view is denoted by Yna, and the view width for horizontal view is denoted by Xna. n indicates the type of field of view. In the case of discrimination field of view, n is 0. In the case of effective field of view, n is 1. In the case of stable field of view, n is 2.

FIG. 15 is an explanatory diagram illustrating an example definition table of various types of constants. The table includes an identifier, a unit, and a standard value for each of the types of constant, for instance. For instance, the naked eye resolution is denoted by Res, the unit is [mm], and the standard value is "0.1". For instance, discrimination field of view-horizontal angle is denoted by W0h, the unit is [degree], and the standard value is "5.0". For instance, discrimination field of view-vertical angle is denoted by W0v, the unit is [degree], and the standard value is "5.0".

For instance, effective field of view-horizontal angle is denoted by W1h, the unit is [degree], and the standard value is "30.0". For instance, effective field of view-vertical angle is denoted by W1v, the unit is [degree], and the standard value is "20.0". For instance, stable field of view-horizontal angle is denoted by W2h, the unit is [degree], and the standard value is "60.0". For instance, stable field of view-vertical angle is denoted by W2v, the unit is [degree], and the standard value is "45.0".

FIG. 16 is an explanatory diagram illustrating an example definition of each length on the display. The horizontal length of the display 608 is denoted by Xp for the case of [pixel] unit or denoted by Xm for the case of [mm] unit. The viewpoint position is denoted by [Xc, Yc].

The diagonal length of the display 608 is denoted by Di for the case of [inch] unit or denoted by Dm for the case of [mm] unit. The vertical length of the display 608 is denoted by Yp for the case of [pixel] unit or denoted by Ym for the case of [mm] unit.

Next, the client terminal device 102 prepares the following basic information in advance. The client terminal device 102 is able to obtain the following Di, Xp, Yp from an OS in execution.

Di: display diagonal length in the [inch] unit
Xp: display horizontal length in the [pixel] unit
Yp: display vertical length in the [pixel] unit Also, the client terminal device 102 determines the display distance Lm in the unit of [mm] by giving the display diagonal length to a display distance simple calculation table.

Figures 17, 18:
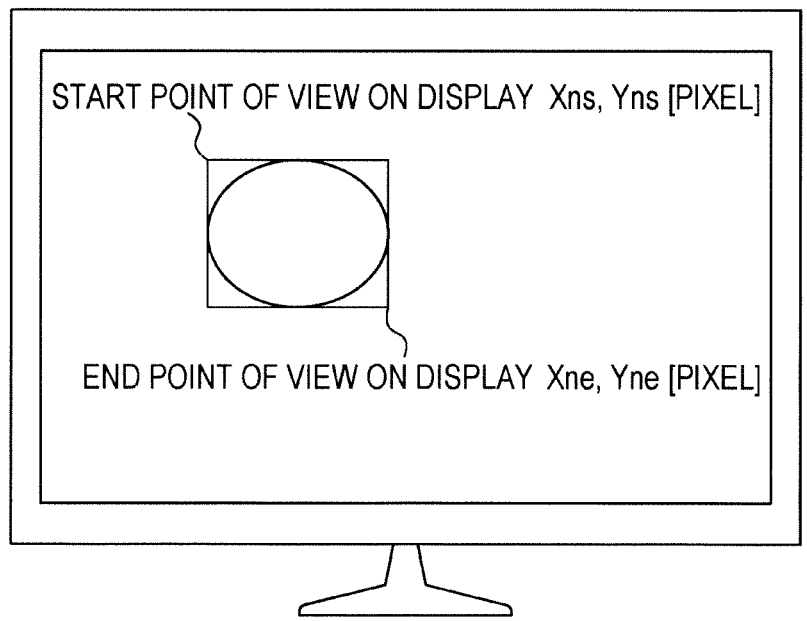
FIG. 17 is a diagram illustrating an example of a display distance simple calculation table, according to an embodiment.
FIG. 18 is a diagram illustrating an example of a view range, according to an embodiment.

FIG. 17 is an explanatory diagram illustrating an example display distance simple calculation table. The display distance simple calculation table is a table that, upon being given, for instance, the size of the display 608, provides the distance Lm. Here, Di1 and Di2 of the display distance simple calculation table are the diagonal lengths of the display 608. According to the table, when the diagonal length is not smaller than Di and smaller than Di2, the distance Lm between the display 608 and the human eye is given as a set standard value. For instance, according to the table, when the diagonal length is not smaller than 1 inch and smaller than 8 inches, the distance Lm is 150 [mm]. For instance, according to the table, when the diagonal length is not smaller than 8 inches and smaller than 13 inches, the distance Lm is 200 [mm].

The client terminal device 102 obtains the diagonal length Di from an OS in execution and gives the obtained diagonal length Di to the display distance simple calculation table, thereby obtaining the distance Lm. For instance, when the display 608 is changed, the client terminal device 102 obtains the distance Lm, and causes a storage device, such as the ROM 602, the RAM 603, or the disk 605, to store the distance Lm.

The display diagonal length Dp in the [pixel] unit may be obtained by the following Expression (1).

$$Dp=\sqrt{(Xp^2+Yp^2)} \qquad \text{Expression (1)}$$

The display diagonal length in the [mm] unit may be obtained by the following Expression (2).

$$Dm=Di*2.54 \qquad \text{Expression (2)}$$

The display horizontal length in the [mm] unit may be obtained by the following Expression (3).

$$Xm=Xp*D/Dp \qquad \text{Expression (3)}$$

The display vertical length in the [mm] unit may be obtained by the following Expression (4).

$$Ym=Yp*D/Dp \qquad \text{Expression (4)}$$

Next, the view width of each field of view on the display 608 will be described. The view widths of discrimination field of view are X0a [mm] and Y0a [mm]. The client terminal device 102 determines the view width X0a by Expression (5), and determines the view width Y0a by Expression (6). As illustrated in FIG. 15, the standard value of W0h and MN is 5.0 degrees.

$$X0a \text{ [mm]}=\tan(RAD(W0h/2))*Lm*2 \qquad \text{Expression (5)}$$

$$Y0a \text{ [mm]}=\tan(RAD(W0v/2))*Lm*2 \qquad \text{Expression (6)}$$

The view widths of effective field of view are X1a [mm] and Y1a [mm]. The client terminal device 102 determines the view width X1a by Expression (7), and determines the view width Y1a by Expression (8). As illustrated in FIG. 15, the standard values of W1h and W1v are 30.0 degrees and 20.0 degrees, respectively.

$$X1a \text{ [mm]}=\tan(RAD(W1h/2))*Lm*2 \qquad \text{Expression (7)}$$

$$Y1a \text{ [mm]}=\tan(RAD(W1v/2))*Lm*2 \qquad \text{Expression (8)}$$

The view widths of stable field of view are X2a [mm] and Y2a [mm]. The client terminal device 102 determines the view width X2a by Expression (9), and determines the view width Y2a by Expression (10). As illustrated in FIG. 15, the standard values of W2h and W2v are 60.0 degrees and 45.0 degrees, respectively.

$$X2a\ [\text{mm}] = \tan(RAD(W2h/2))*Lm*2 \qquad \text{Expression (9)}$$

$$Y2a\ [\text{mm}] = \tan(RAD(W2v/2))*Lm*2 \qquad \text{Expression (10)}$$

The correction unit 804 illustrated in FIG. 8 determines whether or not the position information calculated by the calculation unit 803 is included in the range of view on the screen of the display 608. Specifically, the correction unit 804 identifies the range of view on the screen, for instance, based on the viewpoint and the view width on the screen at the current time. The correction unit 804 then determines whether or not the position information calculated by the calculation unit 803 is included in the identified range of view. The view width used here may be selected by a user from the view width of discrimination field of view, the view width of effective field of view, and the view width of stable field of view.

FIG. 18 is an explanatory diagram illustrating an example view range. The correction unit 804 may identify an elliptical area as the view range, for instance, based on the view width around the viewpoint. Thus, it is possible to reproduce a view range of human with high accuracy. Also, the correction unit 804 may identify a rectangular area surrounded by start point of view (Xns, Yns) and end point of view (Xne, Yne) as the view range, for instance, based on the view width around the viewpoint. Thus, it is possible to reduce calculation time.

For instance, the correction unit 804 identifies the start point of view and the end point of view of a view range in the following manner. For instance, in the case of discrimination field of view, the view range is the rectangular area identified by the start point of view (X0s, Y0s)–the end point of view (X0e, Y0e). The correction unit 804 determines the start point of view X0s by Expression (11) below, and determines the end point of view X0e by Expression (12), for instance. For instance, in the case of discrimination field of view, the correction unit 804 determines the start point of view Y0s by Expression (13) below, and determines the end point of view Y0e by Expression (14). The [pixel] unit is used for the start point of view X0s, the start point of view Y0s, the end point of view X0e, and the end point of view Y0e.

$$X0s = \text{Min}(1, Xc - (Xp/Xm*X0a)/2) \qquad \text{Expression (11)}$$

$$X0e = \text{Max}(Xp, Xc - (Xp/Xm*X0a)/2) \qquad \text{Expression (12)}$$

$$Y0s = \text{Min}(1, Yc - (Yp/Ym*Y0a)/2) \qquad \text{Expression (13)}$$

$$Y0e = \text{Max}(Yp, Yc - (Yp/Ym*Y0a)/2) \qquad \text{Expression (14)}$$

For instance, in the case of effective field of view, the view range is the rectangular area identified by the start point of view (X1s, Y1s)–the end point of view (X1e, Y1e). For instance, in the case of effective field of view, the correction unit 804 determines the start point of view X1s by Expression (15) below, and determines the end point of view X1e by Expression (16). Also, for instance, in the case of effective field of view, the correction unit 804 determines the start point of view Y1s by Expression (17) below, and determines the end point of view Y1e by Expression (18).

The [pixel] unit is used for the start point of view X1s, the start point of view Y1s, the end point of view X1e, and the end point of view Y1e.

$$X1s = \text{Min}(1, Xc - (Xp/Xm*X1a)/2) \qquad \text{Expression (15)}$$

$$X1e = \text{Max}(Xp, Xc - (Xp/Xm*X1a)/2) \qquad \text{Expression (16)}$$

$$Y1s = \text{Min}(1, Yc - (Yp/Ym*Y1a)/2) \qquad \text{Expression (17)}$$

$$Y1e = \text{Max}(Yp, Yc - (Yp/Ym*Y1a)/2) \qquad \text{Expression (18)}$$

For instance, in the case of stable field of view, the view range is the rectangular area identified by the start point of view (X2s, Y2s)–the end point of view (X2e, Y2e). For instance, in the case of stable field of view, the correction unit 804 determines the start point of view X2s by Expression (19) below, and determines the end point of view X2e by Expression (20). For instance, in the case of stable field of view, the correction unit 804 determines the start point of view Y2s by Expression (21) below, and determines the end point of view Y2e by Expression (22). The [pixel] unit is used for the start point of view X2s, the start point of view Y2s, the end point of view X2e, and the end point of view Y2e.

$$X2s = \text{Min}(1, Xc - (Xp/Xm*X2a)/2) \qquad \text{Expression (19)}$$

$$X2e = \text{Max}(Xp, Xc - (Xp/Xm*X2a)/2) \qquad \text{Expression (20)}$$

$$Y2s = \text{Min}(1, Yc - (Yp/Ym*Y2a)/2) \qquad \text{Expression (21)}$$

$$Y2e = \text{Max}(Yp, Yc - (Yp/Ym*Y2a)/2) \qquad \text{Expression (22)}$$

The correction unit 804 illustrated in FIG. 8 determines whether or not, for instance, the position information calculated by the calculation unit 803 is included in the identified view range. For instance, when it is determined that the position information is included in the view range, the correction unit 804 does not correct the calculated position information on the mouse position. On the other hand, when it is determined that the position information is not included in the view range, the correction unit 804 corrects the calculated mouse position information so that the corrected mouse position information is information on a position included in the view range.

Figure 19:
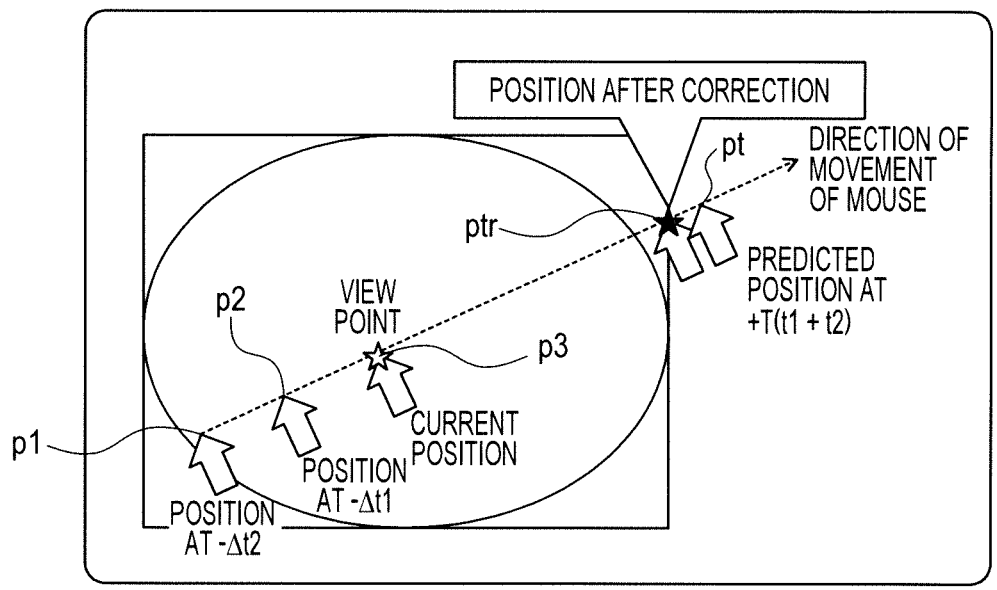
FIG. 19 is a diagram illustrating an example of correction, according to an embodiment.

FIG. 19 is an explanatory diagram illustrating example correction 1. In the example of FIG. 19, the view range corresponding to discrimination field of view is the rectangular area surrounded by the start point of view (X0s, Y0s)–the end point of view (X0e, Y0e). The correction unit 804 determines, for instance, that the calculated position information is not included in the identified view range.

Thus, the correction unit 804 identifies an intersection between the outer boundary of the view range and a straight line segment connecting the mouse position indicated by the mouse position information at the current time and the mouse position indicated by the calculated mouse position information, for instance. The correction unit 804 then corrects the mouse position information so that the identified intersection is the mouse position at the time after a lapse of time T (t1+t2) from the current time.

Figure 20:
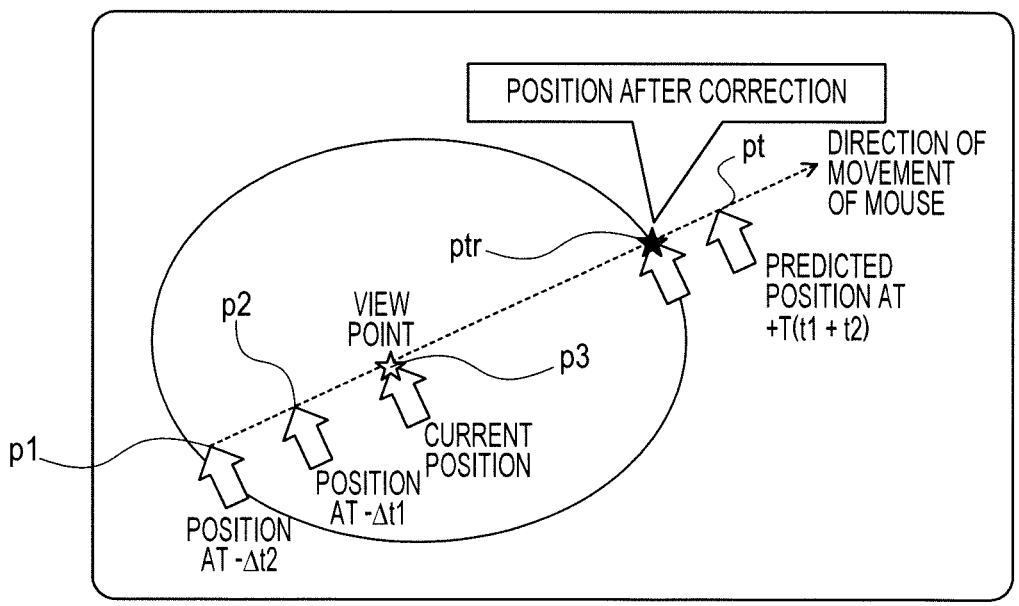
FIG. 20 is a diagram illustrating an example of correction, according to an embodiment.

FIG. 20 is an explanatory diagram illustrating example correction 2. In the example of FIG. 20, the view range corresponding to discrimination field of view is an elliptical area. The correction unit 804 determines, for instance, that the calculated mouse position is not included in the view range. Thus, the correction unit 804 identifies an intersection between the outer boundary line of the view range and a straight line segment connecting the mouse position indicated by the mouse position information at the current time and the mouse position indicated by the calculated mouse position information, for instance. The correction unit 804 then corrects the mouse position information so that the identified intersection is the mouse position at the time after a lapse of time T (t1+t2) from the current time.

(Example Processing Procedure Performed by Client Terminal Device 102)

Figure 21B:
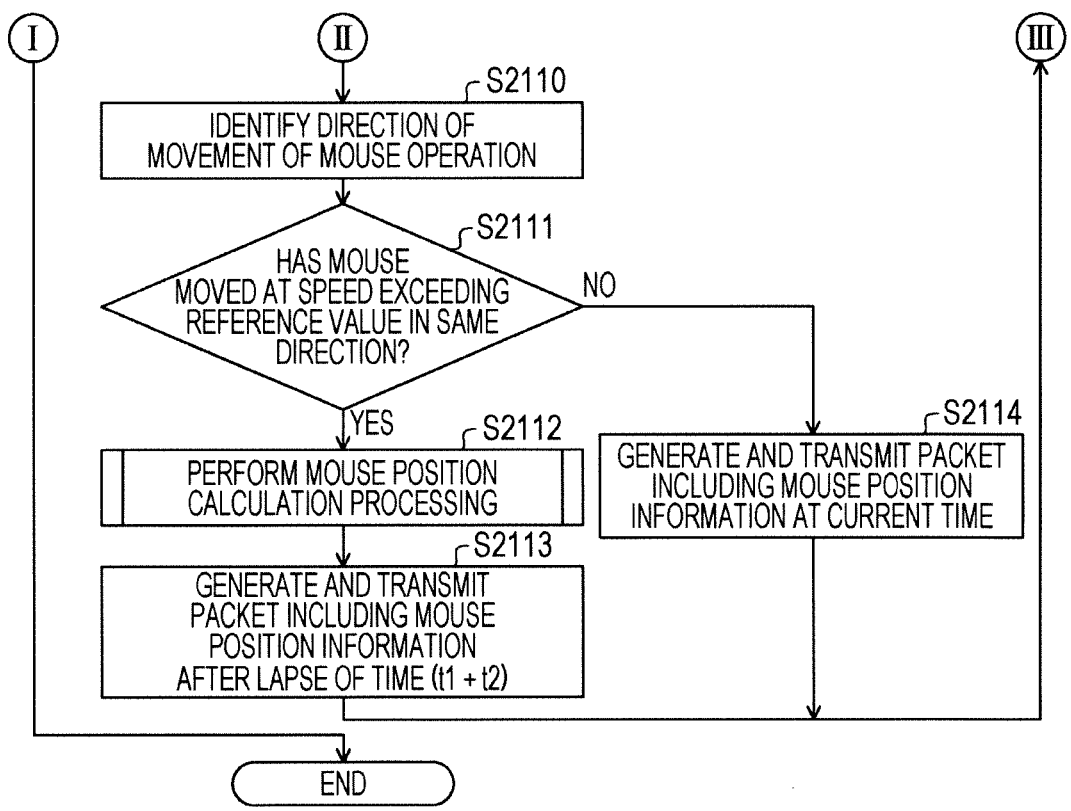

FIG. 21 is a flowchart illustrating an example processing procedure for transmission of operation information by the client terminal device. The client terminal device 102 determines whether or not a mouse operation is started (step S2101). When it is determined that a mouse operation is not started (No in step S2101), the flow returns to step S2101. When it is determined that a mouse operation is started (Yes in step S2101), the client terminal device 102 receives the current mouse position information (step S2102). The client terminal device 102 stores the mouse position information and the current time in association with each other (step S2103).

The client terminal device 102 determines whether or not time Δt has elapsed (step S2104). When it is determined that time Δt has elapsed (Yes in step S2104), the client terminal device 102 receives the current mouse position information (step S2105). The client terminal device 102 then stores the mouse position information and the current time in association with each other (step S2106), and the flow proceeds to step S2107.

When it is determined that time Δt has not elapsed (No in step S2104), the client terminal device 102 determines whether or not the mouse operation is completed (step S2107). When it is determined that the mouse operation is not completed (No in step S2107), the client terminal device 102 determines whether or not transmission interval Δtsd has elapsed (step S2108). In the example of the present flowchart, the transmission interval Δtsd is a multiple of the predetermined time Δt.

When it is determined that the transmission interval Δtsd has not elapsed (No in step S2108), the flow returns to step S2104. When it is determined that the transmission interval Δtsd has elapsed (Yes in step S2108), the client terminal device 102 calculates a speed and an acceleration based on the mouse position information for specified number of times including the current time (step S2109).

The client terminal device 102 identifies the direction of movement by a mouse operation (step S2110). The client terminal device 102 determines whether or not the mouse pointer has been moved by the mouse operation in the same direction at a speed exceeding a reference value (step S2111). When it is determined that the mouse pointer has been moved in the same direction at a speed exceeding a reference value (Yes in step S2111), the client terminal device 102 performs mouse position calculation processing (step S2112).

Next, the client terminal device 102 generates and transmits a packet including the mouse position information after a lapse of time (t1+t2) (step S2113), the flow proceeds to step S2104.

In step S2111, when it is determined that the mouse pointer has not been moved in the same direction at a speed exceeding a reference value (No in step S2111), the client terminal device 102 generates and transmits a packet including the mouse position information at the current time (step S2114), and the flow proceeds to step S2104.

In step S2107, when it is determined that the mouse operation is completed (Yes in step S2107), the client terminal device 102 completes a series of processing.

Figure 22:
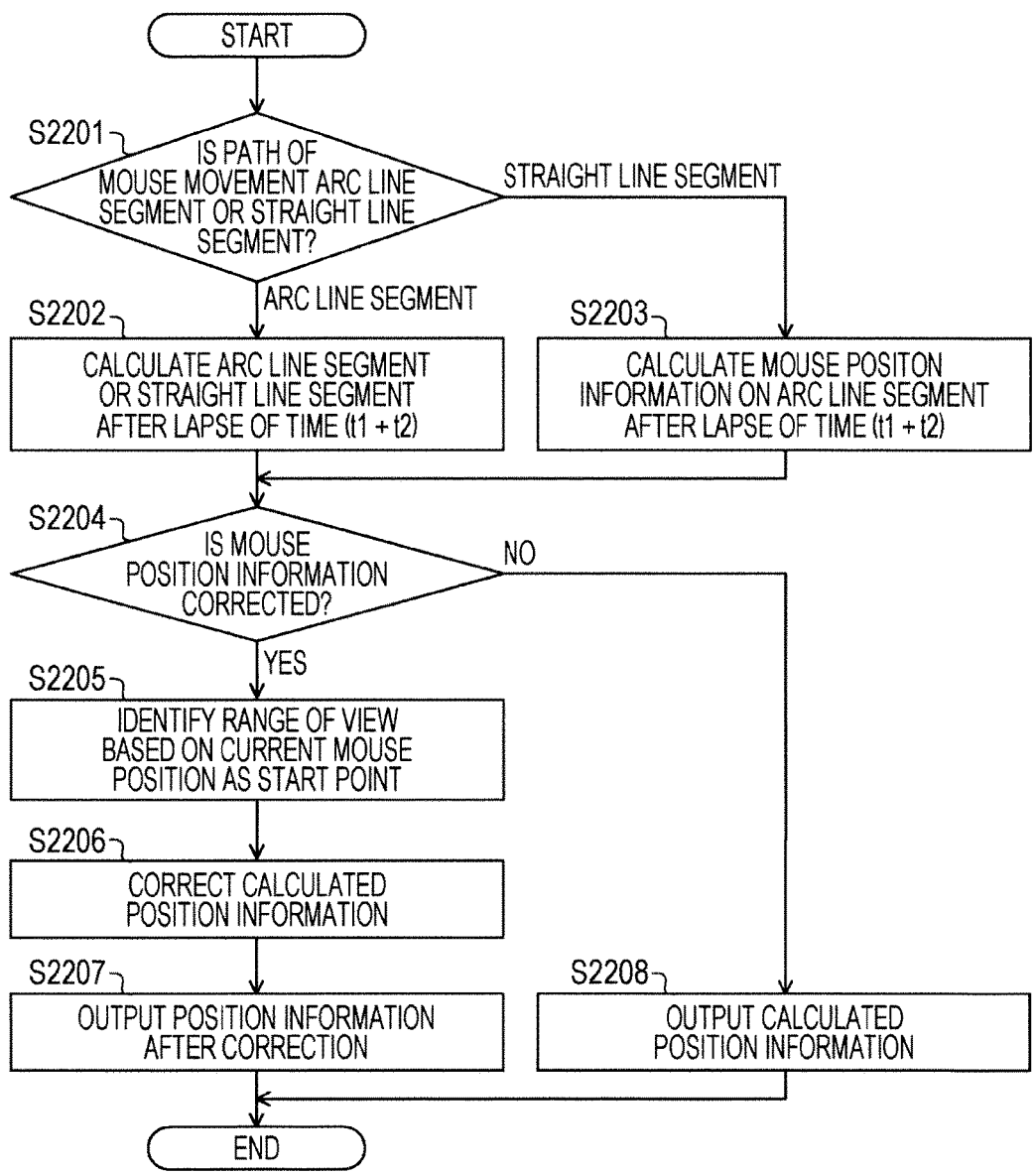
FIG. 22 is a diagram illustrating an example of an operational flowchart for calculation processing, according to an embodiment.

FIG. 22 is a flowchart illustrating the example calculation processing procedure illustrated in FIG. 21. The client terminal device 102 determines whether the path of mouse movement is an arc line segment or a straight line segment (step S2201). When it is determined that the path is an arc line segment (arc line segment in step S2201), the client terminal device 102 calculates mouse position information on the arc line segment after a lapse of time (t1+t2) (step S2202). On the other hand, when it is determined that the path is a straight line segment (straight line segment in step S2201), the client terminal device 102 calculates mouse position information on the straight line segment after a lapse of time (t1+t2) (step S2203).

Next, the client terminal device 102 determines whether or not correction is to be made (step S2204). Whether or not correction is to be made is selectable by a user. When it is determined that correction is to be made (Yes in step S2204), the client terminal device 102 identifies a range of view using the current mouse position as the start point (step S2205). The client terminal device 102 then makes correction so that the calculated position information is included in the range of view (step S2206). The client terminal device 102 outputs the position information after correction (step S2207), and completes a series of processing.

When it is determined that correction is not to be made (No in step S2204), the client terminal device 102 outputs the calculated position information (step S2208), and completes a series of processing.

Figure 23:
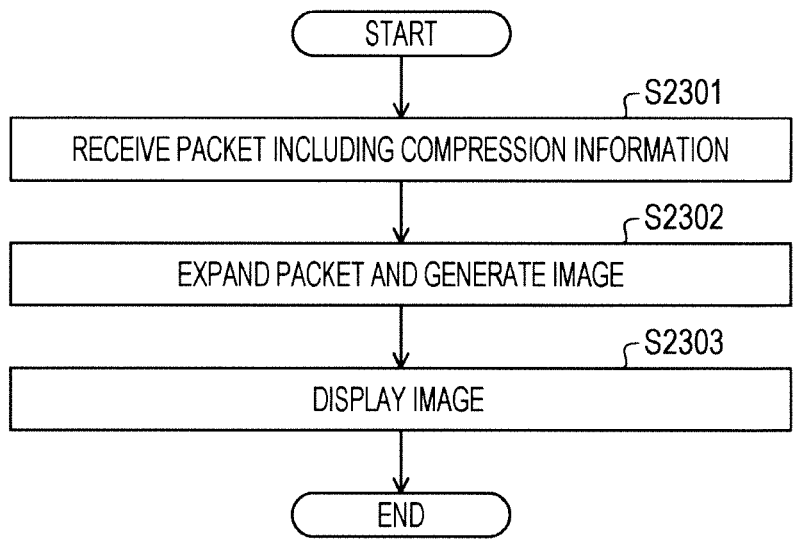
FIG. 23 is a diagram illustrating an example of an operational flowchart for display processing performed by a client terminal device, according to an embodiment.

FIG. 23 is a flowchart illustrating an example display processing procedure performed by the client terminal device. The client terminal device 102 receives a packet including compression information (step S2301). The client terminal device 102 then expands the compression information and generates an image (step S2302). Next, the client terminal device 102 displays the generated image on the display 608 (step S2303), and completes a series of processing.

Although illustration is omitted, in addition to the mouse operation information, the client terminal device 102 transmits operation information on the keyboard to the server 101. Although illustration is omitted, when a mouse operation or a keyboard operation is not performed, the client terminal device 102 issues a ping command, and obtains RTT. The client terminal device then updates the time T(t1+t2).

(Example Processing Procedure Performed by Server 101)

Figure 24:
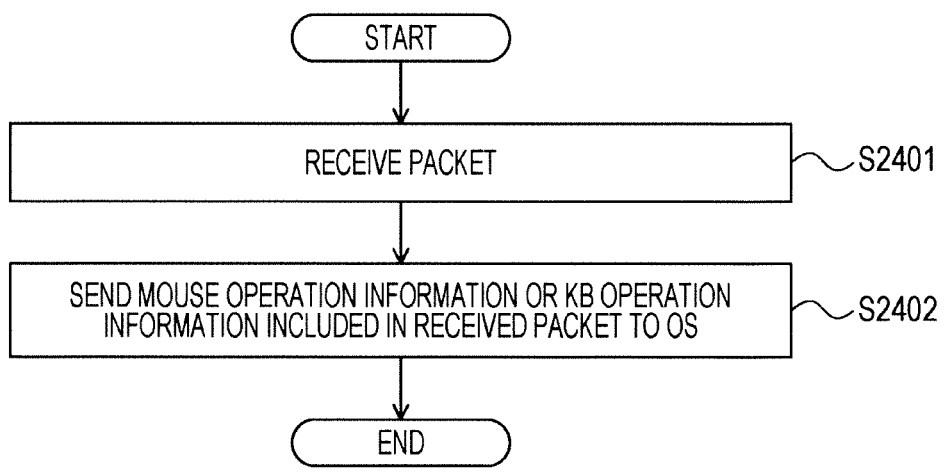
FIG. 24 is a diagram illustrating an example of an operational flowchart for packet receiving processing by a server, according to an embodiment.

FIG. 24 is a flowchart illustrating an example packet receiving processing procedure by the server. The server 101 receives a packet (step S2401). Next, the server 101 sends the mouse operation information or KB operation information included in the received packet to the OS (step S2402), and completes a series of processing. The KB operation information is operation information on the keyboard 607.

Figure 25:
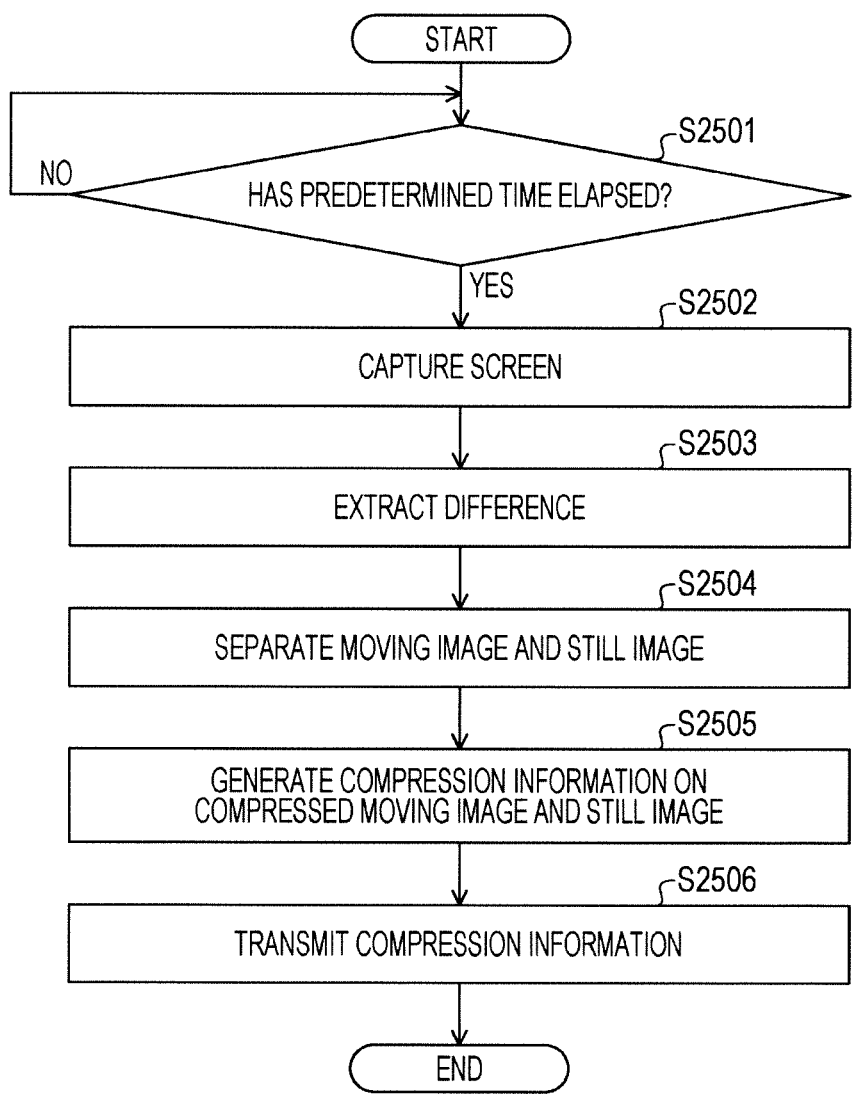
FIG. 25 is a diagram illustrating an example of an operational flowchart for transmission processing by a server, according to an embodiment.

FIG. 25 is a flowchart illustrating an example transmission processing procedure by the server. The server 101 determines whether or not a predetermined time has elapsed (step S2501). The predetermined time here is a time for monitoring a packet. When it is determined that the predetermined time has not elapsed (No in step S2501), the flow returns to step S2501. Next, when it is determined that the predetermined time has elapsed (Yes in step S2501), the server 101 captures a screen (step S2502). The capture here refers to recording a signal for display as information on the image.

The server 101 extracts the difference between the screen captured currently and the screen captured previously (step S2503). Next, the server 101 separates moving images and still images from each other based on the difference (step S2504). The server 101 then generates compression information in which moving images and still images are compressed (step S2505). The server 101 transmits the compression information (step S2506), and completes a series of processing. Specifically, the server 101 transmits packet information including the compression information.

As described above, when a mouse is moved in the same direction on the screen at a speed exceeding a threshold value, the client terminal device 102 predicts the position of the mouse after communication delay and transmits the predicted position to the server. Thus, it is possible for the client terminal device 102 to display an image on the screen according to the predicted mouse position at the time after a lapse of the communication time. Therefore, it is possible to improve the operational feeling of a user regardless of the communication delay. Also, in the case where the mouse position is predictable simply with high accuracy, the mouse position at the time after a lapse of the communication time is predicted. Consequently, it is possible to avoid prediction failure without causing a delay due to a calculation time.

Also, when the path of the mouse movement on the screen is a straight line segment, the client terminal device 102 calculates mouse position information from an extension line of the straight line segment in the direction of the movement at the time after a lapse of the communication time. On the other hand, when the path of the mouse movement on the screen is an arc line segment, the client terminal device 102 calculates mouse position information from an extension line of the arc line segment in the direction of the movement at the time after a lapse of the communication time.

When the position indicated by the calculated position information is not included in the view range on the screen which is determined based on the position information at the current time and the view width according to a specific field of view, the client terminal device 102 corrects the position indicated by the position information so that the corrected position is included in the identified view range. Also, the specific field of view is a discrimination field of view or an effective field of view. Thus, it is possible to avoid moving an object to a position out of the view of a user of the client terminal device 102.

Also, the view width is a value determined based on the size of a display device included in the client terminal device 102.

Also, a time interval at which to store the position information in the storage unit is shorter than a time interval at which to transmit the operation information to the server. Consequently, the mouse position in the near future is predictable by the mouse movement in a short time, and it is possible to improve the accuracy of calculation of the position information. Also, when a time interval at which to store the position information in the storage unit is shorter than or equal to the time interval at which to transmit the operation information to the server, a configuration may be adopted in which the server predicts the mouse position in the near future. In this case, the client terminal device 102 simply transmits the position information on the mouse at the current time, and the server stores the received position information in time series in the storage unit of the server. The server may predict the mouse position in the near future based on the received position information.

Also, the client terminal device 102 calculates the speed from the specific time to the current time, and calculates position information on the figure at the time after a lapse of the first time from the current time, based on the calculated speed. Thus, position information is easily calculable by a simple arithmetic, and the calculation time may be reduced.

Also, the client terminal device 102 calculates the acceleration from the specific time to the current time, and calculates position information on the figure at the time after a lapse of the first time from the current time, based on the calculated acceleration. Thus, position information is easily calculable by a simple arithmetic, and the calculation time may be reduced.

It is to be noted that the virtual desktop processing method described in the embodiment may be implemented by causing a computer, such as a personal computer or a workstation, to execute a virtual desktop processing program which is prepared in advance. The present virtual desktop processing program is recorded on a computer-readable recording medium, such as a magnetic disk, an optical disk, or a Universal Serial Bus (USB) flash memory, and is read from the recording medium and executed by a computer. The virtual desktop processing program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer included in a client terminal device to execute a process, the client terminal device being configured to cause a server to execute an application program, the process comprising:

causing a memory to store, in time series, pieces of position information on a figure representing a target of an operation on a screen shared between the server and the client terminal device, the pieces of position information being obtained by an operation to an input device included in the client terminal device;

determining, based on the pieces of position information stored in time series in the memory, whether or not the figure has been moved by the operation in the same direction on the screen at a speed exceeding a threshold value during an interval from a specific time out of times at which the pieces of position information were obtained to a current time;

when it is determined that the figure has been moved in a same direction at a speed exceeding the threshold value, calculating a first piece of position information indicating a position at which the figure is expected to be located at a time after a lapse of a first time from the current time, based on the pieces of position information stored in time series in the memory, the first time including a time taken for communication between the client terminal device and the server;

transmitting operation information including the calculated first piece of position information to the server;

receiving, from the server, image information including an image on the screen, the image being obtained by executing the application program based on the transmitted operation information including the calculated first piece of position information; and displaying the image included in the received image information.

2. The non-transitory, computer-readable recording medium of claim 1, wherein the calculating the first piece of position information includes:

in a case where a line connecting positions indicated by the pieces of position information obtained at times from the specific time to the current time is an arc line segment, calculating the first piece of position information indicating the figure which is expected to be on a first extension line of the arc line segment, the first extension line extending from a position of the figure at the current time in a direction of forward movement of the figure; and in a case where a line connecting positions indicated by the pieces of position information obtained at times from the specific time to the current time is a straight line segment, calculating the first piece of position information indicating the figure which is expected to be on a second extension line of the straight line segment, the second extension line extending from a position of the figure at the current time in a direction of forward movement of the figure.

3. The non-transitory, computer-readable recording medium of claim 1, the process further comprising:

identifying a view range on the screen which is determined based on a second piece of position information indicating the figure at the current time and a view width according to a specific field of view;

when a position indicated by the first piece of position information is not included in the identified view range, correcting the first piece of position information so that a position indicated by the corrected first piece of position information is included in the identified view range; and transmitting the operation information including the corrected first position information to the server.

4. The non-transitory, computer-readable recording medium of claim 3, wherein the specific field of view is a discrimination field of view or an effective field of view.

5. The non-transitory, computer-readable recording medium of claim 3, wherein the view width is a value determined based on a size of a display device included in the client terminal device.

6. The non-transitory, computer-readable recording medium of claim 1, wherein a time interval at which to store the pieces of position information in the memory is shorter than a time interval at which to transmit the operation information to the server.

7. The non-transitory, computer-readable recording medium of claim 1, wherein the first piece of position information is calculated by:
calculating a speed from the specific time to the current time, based on the pieces of position information stored in time series in the memory, and
calculating the first piece of position information, based on the calculated speed.

8. The non-transitory, computer-readable recording medium of claim 1, wherein the first piece of position information is calculated by:
calculating an acceleration from the specific time to the current time, based on the pieces of position information stored in time series in the memory, and
calculating the first piece of position information, based on the calculated acceleration.

9. A method performed by a client terminal device that causes a server to execute an application program, the method comprising:

causing a memory provided for the client terminal device to store, in time series, pieces of position information on a figure representing a target of an operation on a screen shared between the server and the client terminal device, the pieces of position information being obtained by an operation to an input device included in the client terminal device;

determining, based on the pieces of position information stored in time series in the memory, whether or not the figure has been moved by the operation in the same direction on the screen at a speed exceeding a threshold value during an interval from a specific time out of times at which the pieces of position information were obtained to a current time;

when it is determined that the figure has been moved in a same direction at a speed exceeding the threshold value, calculating a first piece of position information indicating a position at which the figure is expected to be located at a time after a lapse of a first time from the current time, based on the pieces of position information stored in time series in the memory, the first time including a time taken for communication between the client terminal device and the server;

transmitting operation information including the calculated first piece of position information to the server;

receiving, from the server, image information including an image on the screen, the image being obtained by executing the application program based on the transmitted operation information including the calculated first piece of position information; and displaying the image included in the received image information.

10. A system comprising:

a server including a first processor; and a client terminal device including a second processor and a memory, the second processor being configured to cause the first processor of the server to execute an application program, wherein the second processor of the client terminal device is configured to:

cause the memory to store, in time series, pieces of position information on a figure representing a target of an operation on a screen shared between the server and the client terminal device, the pieces of position information being obtained by an operation to an input device included in the client terminal device;

determine, based on the pieces of position information stored in time series in the memory, whether or not the figure has been moved by the operation in the same direction on the screen at a speed exceeding a threshold value during an interval from a specific time out of times at which the pieces of position information were obtained to a current time;

when it is determined that the figure has been moved in a same direction at a speed exceeding the threshold value, calculate a first piece of position information indicating a position at which the figure is expected to be located at a time after a lapse of a first time from the current time, based on the pieces of position information stored in time series in the memory, the first time including a time taken for communication between the client terminal device and the server;

transmit operation information including the calculated first piece of position information to the server;
receive, from the server, image information including an image on the screen, the image being obtained by executing the application program based on the transmitted operation information including the calculated first piece of position information; and
display the image included in the received image information.

* * * * *